(12) United States Patent
Hirata et al.

(10) Patent No.: US 8,290,341 B2
(45) Date of Patent: Oct. 16, 2012

(54) VIDEO PLAYING DEVICE, VIDEO PLAYING METHOD, AND VIDEO PLAYING PROGRAM HAVING AUTOMATIC VIDEO SELECTIONS BASED UPON USER CONCENTRATION

(75) Inventors: Kyoji Hirata, Tokyo (JP); Eiji Kasutani, Tokyo (JP); Masumi Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 977 days.

(21) Appl. No.: 12/226,921

(22) PCT Filed: May 15, 2007

(86) PCT No.: PCT/JP2007/000517
§ 371 (c)(1),
(2), (4) Date: Oct. 31, 2008

(87) PCT Pub. No.: WO2007/132566
PCT Pub. Date: Nov. 22, 2007

(65) Prior Publication Data
US 2009/0097822 A1    Apr. 16, 2009

(30) Foreign Application Priority Data

May 15, 2006   (JP) ................................ 2006-135327

(51) Int. Cl.
*H04N 9/80* (2006.01)
(52) U.S. Cl. ...................................................... 386/248
(58) Field of Classification Search .................. 386/248, 386/239, 278, 343
See application file for complete search history.

(56) References Cited

U.S. PATENT DOCUMENTS

| 4,912,702 | A | * | 3/1990 | Verbiest | 370/538 |
|---|---|---|---|---|---|
| 7,460,761 | B2 | * | 12/2008 | Inoue et al. | 386/248 |
| 7,762,665 | B2 | * | 7/2010 | Vertegaal et al. | 351/209 |
| 2003/0052911 | A1 | * | 3/2003 | Cohen-solal | 345/738 |
| 2004/0013398 | A1 | * | 1/2004 | Miura et al. | 386/46 |
| 2005/0207725 | A1 | * | 9/2005 | Sako et al. | 386/46 |
| 2006/0094934 | A1 | * | 5/2006 | Shirai et al. | 600/300 |

FOREIGN PATENT DOCUMENTS

JP         11-98174         4/1999
(Continued)

OTHER PUBLICATIONS

Motoyuki et al, machine generated translation of JP 2004-362145, Dec. 2004.*

(Continued)

*Primary Examiner* — David Harvey
(74) *Attorney, Agent, or Firm* — McGinn IP Law Group, PLLC

(57) ABSTRACT

A video playing device includes a classification unit classifying a video or a video section to be played according to a degree of user's necessary concentration on a video. A user's concentration derivation unit calculates a degree of user's concentration on the video. A video selection unit selects the video or the video section to be played based on a classification result and the degree of user's concentration on the video. A video playing unit plays the video or the video section selected by the video selection unit, and operates so as to preferentially play videos or video sections which the degree of user's concentration necessary to watch each video or video section is lower than the current degree of user's concentration.

36 Claims, 21 Drawing Sheets

FOREIGN PATENT DOCUMENTS

| | | | |
|---|---|---|---|
| JP | 2001-251580 | | 9/2001 |
| JP | 2002-247525 | | 8/2002 |
| JP | 2005-034484 | * | 7/2003 |
| JP | 2003-281864 | | 10/2003 |
| JP | 2004-312401 | * | 11/2004 |
| JP | 2004-362145 | * | 12/2004 |
| JP | 2005-34484 | | 2/2005 |
| JP | 2005-056205 | * | 3/2005 |
| JP | 2005-223778 | | 8/2005 |
| JP | 2005-260578 A1 | | 9/2005 |
| JP | 2005-277543 | | 10/2005 |
| JP | 2006-60778 | | 3/2006 |

OTHER PUBLICATIONS

Miyajima et al, Machine generated translation of JP2005-056205, Mar. 2005.*

Japanese Office Action dated May 15, 2012 with an English translation.

* cited by examiner

VIDEO PLAYING DEVICE, VIDEO PLAYING METHOD, AND VIDEO PLAYING PROGRAM HAVING AUTOMATIC VIDEO SELECTIONS BASED UPON USER CONCENTRATION

TECHNICAL FIELD

The present invention relates to a video playing device, a video playing method, and a video playing program for playing videos. More specifically, the present invention relates to a video playing device, a video playing method, and a video playing program for dynamically changing a video playing method according to a video watching situation in an environment of watching videos in parallel to other operation.

BACKGROUND ART

Conventionally, a video playing device or a video presenting device of this type reads videos stored in the device in advance or videos acquired from outside of the device, and plays the videos in a predefined order, thereby presenting video information to a user. If the user changes a playing order or a playing speed, operation for the change is interactively performed using a fast-forward button or a jump button in the device.

A device for performing video watching in parallel to other operations including the video watching is widely used in the world. As a device for watching a plurality of videos simultaneously, there is known a playing device, such as a television receiver, including a plurality of decoders in the device and simultaneously playing a plurality of videos on a plurality of windows (parent-child windows). There is also known a video playing device, such as a calculator or a portable terminal, generating a plurality of windows for performing web browsing, programming, mail creation and the like as well as one or a plurality of video windows, and realizing video watching simultaneously with other operation such as web browsing.

Patent Document 1 describes an example of a method of performing video watching simultaneously with other operation (telephone conversation). The Patent Document 1 describes an audiovisual watching device restarting watching a program back to a start of a missing section if a user misses a part of the program by interruption due to arrival of a call or the like. The audiovisual watching device described in the Patent Document 1 includes a television function, a recording function, a playing function, and a mobile telephone function includes a playing interrupting unit that interrupts replay of videos and that holds an interrupt position at arrival of a call and a playing control unit that starts a playing operation at the interrupt position at end of the telephone conversation.

Patent Document 1: Japanese Patent Application Laid-Open No. 2005-223778

DISCLOSURE OF THE INVENTION

The conventional method of performing video watching in parallel to other operation has the following problems. The first problem is that manipulation of other operation such as mail creation or web browsing to be performed in parallel to video watching is complicated. The other problem is that if the user concentrates on other operation, then the user cannot pay due attention to videos being played, and misses important parts of videos or insufficiently understands the important parts thereof, resulting in incapability to understand the entire videos. Conversely, if the user concentrates on video watching, the user can insufficiently pay attention to the operation performed in parallel, resulting in deterioration in efficiency for the operation performed in parallel.

Moreover, the audiovisual watching device interrupting video watching while other operation is being performed (during the telephone conversation), as described in the Patent Document 1, has the problem that the user cannot sufficiently watch videos for the same time since videos are not played while the user is performing other operation. If it takes long time for other operation, in particular, video playing is interrupted uniformly during entire time of other operation irrespective of a state and a content of other operation to be performed in parallel. As a result, the conventional device is incapable of satisfying an instance in which the user desires to "watching videos while performing other operation" when an operating load is lessened.

It is, therefore, an object of the present invention to realize more effective video watching by avoiding the problem that a user cannot understand entire videos without deteriorating efficiency for an operation performed in parallel to the video watching in an environment in which the user "watching videos while performing other operation", that is, the user performs both other operation and video watching simultaneously.

It is another object of the present invention to realize time efficient information acquisition by continuing video watching while performing other operation without disturbing understanding of videos.

According to an exemplary aspect of the invention, there is provided a video playing device for playing a video, including:

a classification unit classifying a video or a video section to be played according to a degree of user's necessary concentration on video;

a user's video concentration calculation unit calculating a degree of user's concentration on a video; and a video playing unit comparing a current degree of user's concentration on a video with the degree of concentration necessary to watch the each video or the each video section to be played according to a classification result of the classification unit, and preferentially playing videos or video sections which the degree of user's concentration necessary to watch the each video or the each video section is lower than the current degree of user's video concentration on a video.

Further, the video playing device may further include a storage unit storing the relation between the video or the video section to be played and the degree of user's concentration, and the classification unit may classify the video or the video section to be played while referring to the storage unit.

The video playing device may include: a video storage unit storing the video to be played; a video metadata storage unit storing metadata of the video and including at least information about the video sections; and a video selection unit selecting the video or the video section to be played based on the degree of user's concentration by the user's concentration calculation unit and the classification result of the classification unit for the video or the video section to be played, and the classification unit classifies each of the video or each of the video section stored in the video storing unit based on the degree of user's concentration necessary to watch the video or the video section, and the video playing unit may play the video or the video section selected by the video selection unit.

The video selection unit may select the video or the video section which the degree of the user's concentration necessary to watch the video or the video section is lower than the current degree of the concentration on the video if the degree of the user's concentration on the video is lower than a threshold value.

The video playing device may include a video playing history storage unit storing previously played videos or video sections as history information, and the video selection unit may select the video or the video section to be played based on the degree of user's concentration calculated by the user's concentration calculation unit, the classification result of the classification unit for each video or each video section to be played, and the history information stored in the video playing history storage unit.

The video selection unit may select a video or a video section which a degree of concentration necessary to watch is lower than the current degree of user's concentration other than the previously produced videos or the video sections indicated by the history information stored in the video playing history storage unit.

The video playing device may include: a relational information storage unit storing relational information indicating subordination among each of videos or each of video sections of the videos, and the video selection unit may select the video or the video section which is in subordination to videos or video sections played so far, and for which the degree of concentration necessary to watch is lower than the current degree of user's concentration based on the degree of user's concentration calculated by the user's concentration calculation unit, the classification result of the classification unit for the video or the video section to be played, and the relational information stored in the relational information storage unit.

The video selection unit may select a video section belonging to same video as a video section being played.

The relational information storage unit may store the relational information including at least information indicating temporal continuity among each of the videos or each of the video sections or information indicating semantical subordination.

The video selection unit may select the video section necessary to watch at the degree of concentration lower than the degree of current user's concentration and being in no subordination to a video section being played if a degree of user's concentration necessary to watch a video section temporally continuous to the video section being played is higher than the current degree of user's concentration.

The video playing device may include an interrupt detection unit detecting a change in the degree of user's concentration on a video, and interrupting playing if a degree of user's concentration necessary to watch a video or a video section being played is lower than the current degree of user's concentration on a video.

The interrupt detection unit may detect the change in the degree of user's concentration on the video, and, if the degree of user's concentration necessary to watch the video or the video section being played is lower than the current degree of user's concentration on the video, interrupts playing after playing up to an end of the video section being played; and the video selection unit selects a video section to be played based on the degree of user's concentration detected at which end of the video section.

The video playing device may include an interrupt point storage unit storing information indicating an interrupt point, the interrupt point being a position at which the playing is interrupted, and the interrupt detection unit may store the interrupt point at the time to the interrupt point storage unit if the replay is interrupted and the video selection unit may select a video section to restart playing a video from the interrupt point if the degree of user's concentration is higher than a degree of concentration necessary to watch a video section temporally continuous to the interrupt point after the interrupt detection unit interrupts playing.

The playing video selection unit may select a video section so as to restart playing a video from an interrupt point after finishing playing all video sections in subordination to the video section currently being played after interrupting replay.

The interrupt detection unit may interrupt replay and stores an interrupt point at which replay is interrupted in an interrupt point storage unit if the degree of user's concentration is higher than a degree of user's concentration necessary to watch a video section temporally continuous to the video section being played. The video selection unit may select the video section being in semantically no subordination to a video section being played among the video sections to be watched at the degree of concentration lower than the degree of user's video concentration detected at which playing is interrupted if playing is interrupted by interrupt detection unit, moreover, select a video section which so as to restart playing a video from an interrupt point if the degree of user's video concentration is higher than the degree of user's concentration ratio necessary to watch a video section temporally continuous to interrupt point when playing of a video section being in semantically no subordination ends.

The classification unit may calculate the degree of concentration ratio necessary to watch the video or the video section to be played based on one or more pieces of information out of information indicating a genre, an importance level, a difficulty level, and a coincidence with a user's preference, and classifies the video or the video section to be played according to the calculated degree of concentration.

The classification unit may use, as the difficulty level, one or more pieces of information out of a quantity of voices per unit time included in the video or the video section and number of characters presented per unit time.

The video playing device may include a user information acquisition unit acquiring user information including one or more pieces of information out of information indicating a user's ability, a user's preference, and a user's intention of video watching, and the classification unit may change the degree of concentration necessary to watch the video or the video section based on the user information acquired by the user information acquisition unit. The term acquiring user information means for example, causing user to input the user information or deriving the user information from history information previously played.

The degree of user's concentration calculation unit may calculate the degree of user's concentration by estimation the degree of user's concentration on the video based on one or more pieces of information out of information indicating a video playing situation, indicating a degree of concentration of a concentration on other operation performed in parallel, and a video watching environment.

The degree of user's concentration calculation unit may use, as the video playing situation, one or more pieces of information out of a screen size of a video being played, a screen position, and a volume of a played voice.

The user's concentration calculation unit may use, as the degree of concentration on other operation performed in parallel, one or more pieces of information out of a type of each application being run, a screen size, a screen position, and an information input amount per unit time.

The user's concentration calculation unit may use, as the degree of concentration on other operation performed in parallel, number of key strokes per unit time.

The user's concentration calculation unit may use, as the video watching environment, one or more pieces of information out of time at which video replay is performed, a position information, and a noise amount at a playing location.

The user's video concentration calculation unit may estimate the degree of user's concentration on the video based on user's line of sight information.

The video playing device may include a stop and start control unit controlling a stop and a restart of video playing, and the stop and start control unit may stop playing the video until the degree of user's concentration on a video become equal to the degree of concentration necessary to play the video if the video or the video section to be played is not present as a result of determination based on predetermined condition.

The video playing device may include an input unit inputting information indicating an instruction to stop or restart replay according to a user's operation, and the stop and start control unit may stop playing and reselects a video or a video section if detecting the information indicating a user's stop instruction input from the input unit.

The video playing device may include a selection unit causing a user to select the video or the video section to be played, and the stop and start control unit may stop playing and controls the selection unit to reselect the video or the video section if detecting the information indicating the user's stop instruction input from the input unit.

The stop and start control unit may stop playing and controls the playing video selection unit to reselect the video or the video section if the information indicating the user's stop instruction is input via the input unit. The playing video selection unit may receive instruction from the stop and start control unit and perform selection from among the videos or the video sections other than stopped videos or the video sections based on the predetermined condition.

The video playing device may include a classification result update unit updating the classification result for the video or the video section for which the user's stop instruction is transmitted if the information indicating the user's stop instruction is input via the input unit.

According to another exemplary aspect of the invention, there is provided a video playing method for playing a video, including:

classifying a video or a video section to be played according to a degree of user's necessary concentration a video;

calculating a degree of user's video concentration indicating of a degree of a user's concentration on the video; and comparing a current degree of user's concentration on a video with the degree of user's concentration necessary to watch the each video or the each video section to be played according to a classification result of the classification unit, and preferentially playing the videos or the video sections which the degree of user's concentration lower than the current degree of user's concentration on a video.

The video playing method may further include a storage unit storing the relation between the video or the video section to be played and the degree of user's concentration, and the classification unit may classify the video or the video section to be played while referring to the storage unit.

The video playing method may include: storing the video to be played; storing metadata of video including at least information about the video sections; classifying each of video or each of the video section stored based on a degree of user's concentration necessary to watch the video or the video section; calculating a degree of user's concentration on the video; selecting the video or the video section to be played based on the degree of user's concentration and a classification result for the each video or the each video section to be played; and playing the selected video or the selected video section.

According to another exemplary aspect of the invention, there is provided a video playing program for playing a video, causing a computer to execute:

a processing for classifying a video or a video section to be played according to a degree of user's necessary concentration on video;

a processing for calculating a degree of user's concentration on a video; and a processing for comparing a current degree of user's concentration on a video with the degree of concentration necessary to watch the each video or the each video section to be played according to a classification result of the classification unit, and preferentially playing the videos or the video sections which the degree of user's concentration necessary to watch the each video or the each video section lower than the current of user's concentration.

The video playing program may further include a storage unit storing the relation between the video or the video section to be played and the degree of user's concentration, and the classification unit may classify the video or the video section to be played while referring to the storage unit.

The video playing program may cause a computer including storage device storing the video to be played and metadata of the video being information accompanying the video to be played and including at least information about the video sections to execute: a processing for classifying the each of video or each of the video section to be played based on a degree of user's concentration necessary to watch the video or the video section; a processing for calculating a degree of user's concentration on a video; a processing for selecting the video or the video section to be played based on the calculated degree of user's concentration and a classification result for the video or the video section to be played; and a processing for playing the selected video or the video section.

According to one exemplary aspect of the invention, the classification unit classifies the video or the video section to be played according to the degree of concentration necessary to watch, the user's concentration calculation unit calculates the degree of user's concentration on the video, and the playing video selection unit selectively plays the video or the video section to be played according to the degree of user's concentration on the video. Therefore, if the degree of concentration for other operation is high, the video or the video section which the user easily "watching videos while performing other operation" is preferentially selected and played. Accordingly, it is possible to attain video watching without insufficient understanding of videos such as difficulty in understanding an important part while the user is performing other operation in parallel.

Moreover, according to the one exemplary aspect of the invention, the video section is played and provided according to an operating situation of other operation. It is, therefore, possible to continuously watch video even if the user is performing other operation and realize time-efficient information acquisition within an understandable range.

The present invention is suitably applicable to information processing device playing videos as well as a home server, a car audio set, and a portable terminal.

BRIEF DESCRIPTION OF THE DRAWINGS

The above objects, other objects, features, and advantages become more apparent from exemplary embodiments to be described hereinafter and accompanying drawings.

EXEMPLARY EMBODIMENT

First Exemplary Embodiment

Figure 1:
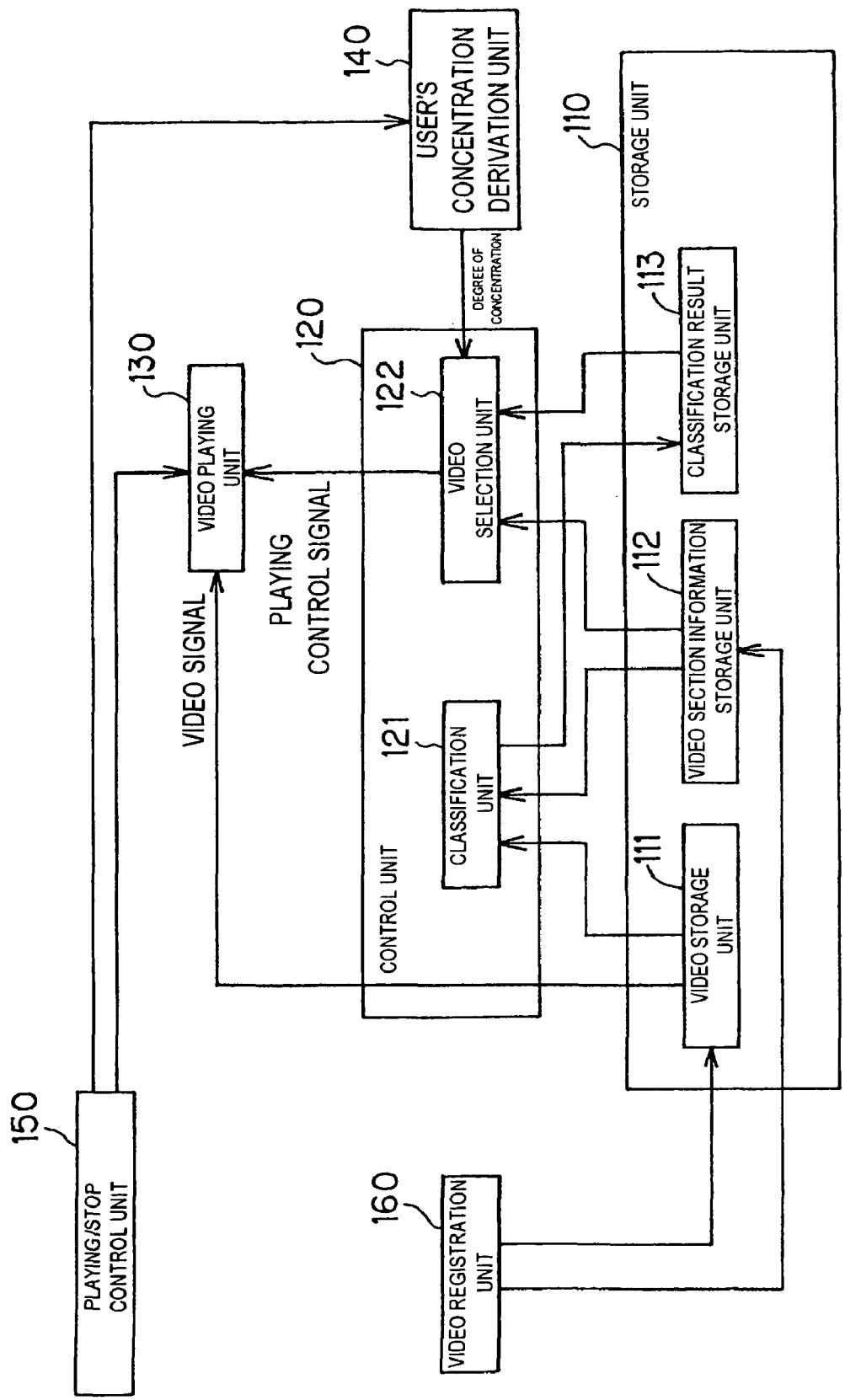
FIG. 1 is a block diagram showing an example of a configuration of a video playing device according to the present exemplary embodiment.

Exemplary embodiments of the present invention will be described hereinafter with reference to the drawings. FIG. 1 is a block diagram showing an example of a configuration of a video playing device according to the present exemplary embodiment.

The video playing device shown in FIG. 1, which is a video playing device for playing videos, includes a classification unit 121 classifying videos or video sections to be played according to the degrees of user's necessary concentration on a video, a user's concentration derivation unit 140 calculating a degree of user's concentration on a video indicating the user's degree of concentration on videos, and a video playing unit 130 comparing a current degree of user's concentration on a video with the degree of user's concentration necessary to watch the each video or the each video section to be played according to a classification result of the classification unit, and preferentially playing videos or video sections which the degree of user's concentration necessary to watch the each video or the each video section is lower than degree of user's concentration on a video.

The video playing device shown in FIG. 1 also includes a classification result storage unit 113 storing the relation between the video or the video section to be played and the degree of user's concentration. The classification unit 121 classifies the videos or the video sections to be played while referring to the classification result storage unit 113.

The video playing device shown in FIG. 1 includes a storage unit 110, a control unit 120, the video playing unit 130, the user's concentration derivation unit 140, a playing/stop control unit 150, and a video registration unit 160.

The storage unit 110 is a storage device storing metadata necessary for each of the videos and for carrying out the present invention. The storage unit 110 includes a video storage unit 111, a video/section information storage unit 112, and the classification result storage unit 113. The control unit 120 which is a processing device performing various controls for carrying out the present exemplary embodiment includes the classification unit 121 and a video selection unit 122. The storage unit 110 is realized by a storage device such as a hard disk, a flash memory, a DVD or a CD. It is to be noted that the storage unit 110 does not necessary has a single form but may be a complex of a plurality of devices consisting of a group of the hard disk, the flash memory, the DVD, and the CD. Furthermore, the storage unit 110 is not necessarily a dedicated storage device but may also serve as another video storage device for playing or a storage device such as a private content.

The video storage unit 111 stores videos to be played. The video/section information storage unit 112 stores information on each video stored in the video storage unit 111 or information on each video and sections of the video (video sections). The video section refers to a series of sequence of videos uniform in terms of the meaning of a content of the video or in terms of signal processing with respect to the video information. The video section is not necessarily one hierarchy but may be a plurality of hierarchies such as chapters or paragraphs. The video/section information storage unit 112 stores video identification information for identifying the video and the metadata of the video while making the video identification information correspond to the metadata of the video if, for example, a using method including selectively playing one video from among a plurality of videos are used. If, for example, a using method including selectively playing a specific section from one video is used, the video/section information storage unit 112 further stores section identification information for identifying the video section of the video and the metadata of the video section including a start position and an end position of the video section while making the section identification information correspond to the metadata of the video section.

The metadata of the video is, for example, a genre (drama, comedy, sports or the like) of the video, bibliographic information such as characters and a shooting place, and the outline of the content. The metadata of the video section is, for example, the outline of the video section and importance set by creator side. The information stored in the video/section information storage unit 112 will be referred to as "video section information" hereinafter. Moreover, the videos or the video sections in storage units of the video/section information storage unit 112, that is, which are internal playing units may be referred to as simply "video sequence" hereinafter.

The classification unit 121 classifies the videos stored in the video storage unit 111 or sections of the videos based on the degree of user's concentration necessary on a video (hereinafter, referred to as "degrees of concentration for watching"). As an example of classification, classification may be made by analyzing media information such as the number of characters on tickers presented per unit time in videos or video sections, the number of output voices, and quantities of motions of objects, and calculating the degrees of concentration for watching from complexity of the media information. Alternatively, the videos or the video sections may be classified by analyzing videos and voices to thereby extract meaning information on a relevant video section, and evaluating an importance level (semantical importance level) in the entire videos to set the evaluated importance level as the degree of concentration for watching. To evaluate the semantical importance level of the video section, metadata such as an annotation (comments) manually added by a video creator or a video registrant may be used.

In another alternative, the degrees of concentration for watching may be calculated based on a coincidence between a user's preference that may be estimated from keywords or the like registered by the user in advance and a video or a video section to be evaluated. It is to be noted that the classification unit 121 may use not only the method including deriving the degree of concentration for watching from these pieces of information (such as the media information, the meaning information, and the user's preference) but also a classification method including reading the degrees of concentration for watching assigned in advances and classifying based on the assigned degrees of concentration for watching or a method including user's adding corrections. The classification result storage unit 113 stores a classification result of the classification unit 121. The information stored in the classification result storage unit 113 will be referred to as "classification result information", hereinafter. The degrees of concentration for watching calculated by the classification unit 121 may be used as the classification result information as they are or information (such as levels 1 to n) indicating classification identification when making classification according to the degrees of concentration for watching may be used as the classification result information. It is to be noted that the classification result information may be stored in a dedicated storage device or in the same storage medium as that for the video storage unit 111 or the video/section information storage unit 112. Moreover a storage format may be stored in the same framework as that of the video storage unit 111 or the video/section information storage unit 112 or may be stored independently.

The user's concentration derivation unit 140 calculates a degree of user's concentration for watching a video (hereinafter, referred to as "the degree of user's concentration ratio on a video"). The user's concentration derivation unit 140 includes, for example, a sensor that observes a user's motion and a control unit that interprets the user's motion. The user's concentration derivation unit 140 estimates the degree of user's concentration for watching a video based on the information input from the sensor. The user's concentration derivation unit 140 may include, for example, a sensor that reads a video presentation environment and estimate the degree of user's concentration on a video by calculating degree of the user's concentration on a video based on the sensor information including a screen size, a screen position, and a volume during presentation of videos.

Alternatively, the user's concentration derivation unit 140 may include a sensor that reads an operation environment of other operation such as mail creation or web browsing if the user performs other operation in parallel. Further, the user's concentration derivation unit 140 may measures a type, a screen size, a screen position, the number of input characters and the like of other operation performed in parallel, calculate a degree of concentration for other operation, and calculate the degree of user's concentration on a video based on the calculated concentration ratio for other operation. In another alternative, the user's concentration derivation unit 140 may include a sensor that monitors a user's input operation and calculate the degree of user's video concentration on a video for other operation based on a total number of operations that are originally unnecessary for watching a video such as the number of key inputs to the entire device per unit time.

In yet another alternative, the user's concentration derivation unit 140 may include a sensor that widely detects environment and calculate the degree of user's concentration on a video based on environmental information such as a location where the video watching takes place, surrounding noise, and time. In still another alternative, the user's concentration derivation unit 140 may include a camera, a biologic sensor or the like and calculate the degree of user's concentration by observing user's line-of-sight information and user states such as a heartbeat, a retina and a brain wave of the user.

The video selection unit 122 decides a video sequence to be played from each of the videos or each of the video sections to be played based on the metadata stored in the video/section information storage unit 112, the classification result information (the degrees of concentration for watching) stored in the classification result storage unit 113, and the degree of user's concentration on a video calculated by the user's concentration derivation unit 140. The video selection unit 122 compares a value of a current degree of user's concentration on a video with a value of the concentration for watching each video or each video section stored in the classification result storage unit 113 and selects a candidate section while monitoring the degree of user's concentration on a video output from the user's concentration derivation unit 140 at a predetermined timing (either regularly or at time of detecting change). As a selection method, the video selection unit 122 may use a method by using information on a video sequence currently being played, a method independently selecting a video sequence to be played, or a method including storing past playing histories and using the playing histories.

The playing/stop control unit 150 controls video playing to be started or stopped according to input of a user's instruction. The video playing unit 130 plays the video sequence selected by the video selection unit 122 from the videos stored in the video storage unit 111. The video playing unit 130 may receive identification information for identifying the video sequence to be played from the video selection unit 122, read and play the videos or the video sections indicated by the identification information from the video storage unit 111. It is to be noted that the video playing unit 130 may support not only ordinary playing function but also special playing functions such as slow playing, pause, fast playing, and repeated playing.

The video registration unit 160 registers the videos to be played and information on the videos and the sections of the videos if necessary. For example, the video registration unit 160 registers, as the videos to be played, video signals input to the video playing device via a receiver terminal including an antenna, a receiver circuit, and a decoder, video signals received via a communication network such as the Internet, video signals input via a video input device such as a video camcorder in the video storage unit 111. If videos as well as metadata of the videos are input to the video playing device, the video registration unit 160 may register the metadata of the videos in the video/section information storage unit 112 as the video/section information while making the metadata correspond to identification information for identifying the videos. The video/section information stored in the video/section information storage unit 112 is not limited to information provided by a video provider to accompany the videos but may be dynamically calculated by causing the video registration unit 160 to read the videos stored in the video storage unit 111 and analyzing the videos. Alternatively, the video/section information may be added manually by the user using an edit function.

Figure 2:
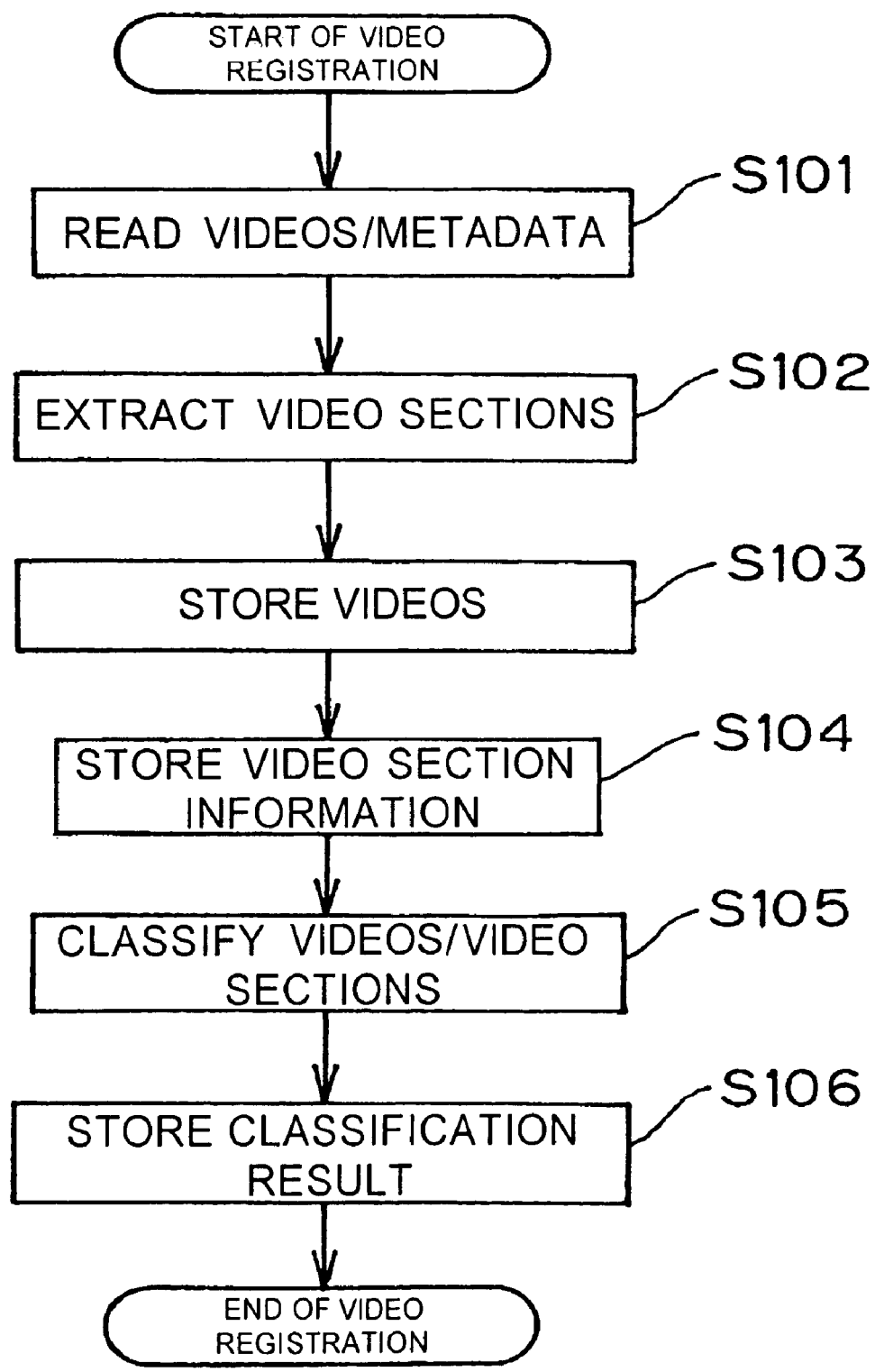
FIG. 2 is a flowchart showing an example of a video registration operation performed by the video playing device according to the present exemplary embodiment.

Operation according to the present exemplary embodiment will next be described. The operation according to the present exemplary embodiment is roughly divided into a video registration operation and a video playing operation. The video registration operation will first be described. FIG. 2 is a flowchart showing an example of the video registration operation performed by the video playing device according to the present exemplary embodiment. As shown in FIG. 2, in the present exemplary embodiment, the videos or the video sections are classified according to the degrees of user's concentration necessary to watch at the time of video registration.

First, the video registration unit 160 reads videos and metadata accompanying the videos (step S101). The video registration unit 160 receives, for example, broadcast signals from an antenna, a receiver circuit, and a decoder included in the video playing device. Further, the video registration unit 160 receives video signals via, for example, the Internet. The video registration unit 160 also inputs video signals output from a video camcorder connected to the video playing device. The video registration unit 160 further reads metadata if the metadata accompanying the video is present.

Next, the video registration unit 160 divides the read videos into series of sequences and extract video sections if necessary (step S102). The video registration unit 160 extracts the video sections by, for example, dividing the videos into shots using continuity or discontinuity of signal features. Alternatively, the video registration unit 160 may extract the video sections by, for example, a method including detecting a visual effect such as fade/wipe from the videos and setting the detected visual effect as a switch of a scene, a method including analyzing voice in the videos and setting a location where the meaning of the voice changes as a boundary, a method including dividing the videos into shots based on script information added to the video or the like, or a method using section information such as chapters or captures added to the videos in advance.

Next, the video registration unit 160 registers the read videos in the video storage unit 111 (step S103). Further, the video registration unit 160 registers the metadata generated or read to accompany the videos registered in the video storage unit 111 in the video/section information storage unit 112 as the video/section information (step S104). If the video sections are extracted, the video registration unit 160 registers a start point and an end point of the video sections as well as identification information allocated to each of the video sections in the video/section information storage unit 112.

Next, the classification unit 121 classifies the videos or each of the video sections of the videos registered in the video storage unit 111 by the video registration unit 160 according to the degree of concentration for watching (step S105). The classification unit 121 calculates the degree of the concentration for watching the videos or each of the video sections of the videos based on the videos registered in the video storage unit 111, information on the videos or the each of video sections of the videos registered in the video/section information storage unit 112, and classifies the videos or each of the video sections of the videos according to the calculated degree of concentration for watching.

Figure 3:
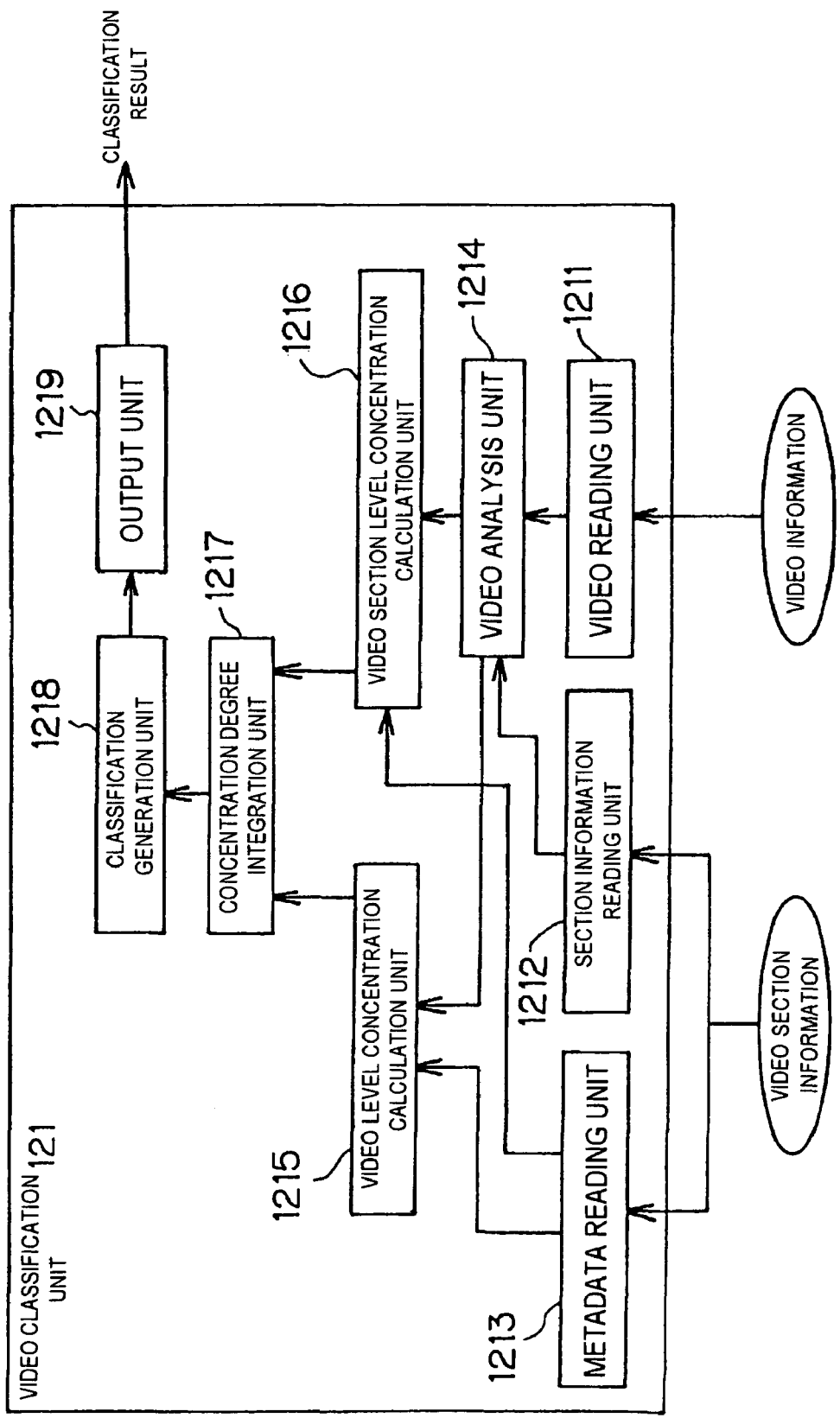
FIG. 3 is a block diagram showing an example of a configuration of a classification unit 121.

FIG. 3 is a block diagram showing an example of a configuration of the classification unit 121. As shown in FIG. 3, the classification unit 121 includes a video reading unit 1211, a section information reading unit 1212, a metadata reading unit 1213, a video analysis unit 1214, a video level concentration calculation unit 1215, a video section level concentration calculation unit 1216, a concentration degree integrating unit 1217, a classification generation unit 1218, and an output unit 1219.

The video reading unit 1211 reads videos to be played from the video storage unit 111. The section information reading unit 1212 reads information indicating the start point and the end point of each section from the video/section information storage unit 112 if necessary. The metadata reading unit 1213 reads information accompanying the videos or the video sections from the video/section information storage unit 112. The video analysis unit 1214 analyzes the content of the video and extracts feature quantities necessary to calculate the degree of concentration for watching the videos or each of the video sections.

The video analysis unit 1214 extracts and count, for example, character information such as the ticker displayed in the video as the feature quantities, and calculates the number of characters per unit time. Alternatively, the video analysis unit 1214 performs, for example, voice recognition and counts the quantity of voices output within the videos or each of the video section. In another alternative, the video analysis unit 1214 extracts meaning information on the videos or each of the video sections by a combination of voice recognition and video recognition and calculates an importance level.

The video level concentration calculation unit 1215 calculates a degree of concentration necessary to watch at a video level based on the feature quantities at the video level extracted by the video analysis unit 1214 and the metadata on a video unit read by the metadata reading unit 1213. The video level concentration calculation unit 1215 may, for example, set a weighting factor according to each importance level in advance for every item of feature quantities calculated by the video analysis unit 1214 and calculate the sum of each of scores. Further, the video level concentration calculation unit 1215 may use, for example, a method of calculating an average and a variance of concentration ratios for all the videos and normalizing the concentration ratios. The video section level concentration calculation unit 1216 performs a similar processing to that performed by the video level concentration calculation unit 1215 on all the videos on each of the video sections and calculates a degree of concentration necessary to watch at video section level if necessary.

The concentration degree integration unit 1217 calculates a final degree of concentration for watching the video or the video section in light of the degree of concentration necessary to watch at the video level and, if necessary, the degree of concentration necessary to watch at the video section level. The concentration degree integration unit 1217 makes a general evaluation in consideration of an instance in which even if a video genre is a dram of which requires a high degree of concentration for watching, the video section is a scene part which does not require a high degree of concentration for watching. The concentration degree integration unit 1217 may use, for example, a method including calculating a sum using a weighting factor or a method including selecting a maximum value or a minimum value of the two ratios.

The classification generation unit 1218 classifies all the videos or all video sections to be played according to the degrees of concentration for watching calculated by the concentration degree integration unit 1217. The output unit 1219 outputs a classification result of the classification generation unit 1218. The output unit 1219 may output, for example, information (such as levels 1 to n) classified and identified the degrees of concentration for watching based on a predetermined criterion or output the degrees of concentration for watching as the information indicating the classification result if the degrees of concentration for watching are calculated as information already classified and identified the degrees of concentration for watching. It is to be noted that this is only an example of derivation and that a part of this example may be dealt with or other feature information may be added to this example calculated to calculate the degrees of concentration for watching.

The classification result storage unit 113 stores the degree of concentration for watching the videos or the video sections output from the classification unit 121 (step S106).

Figure 4:
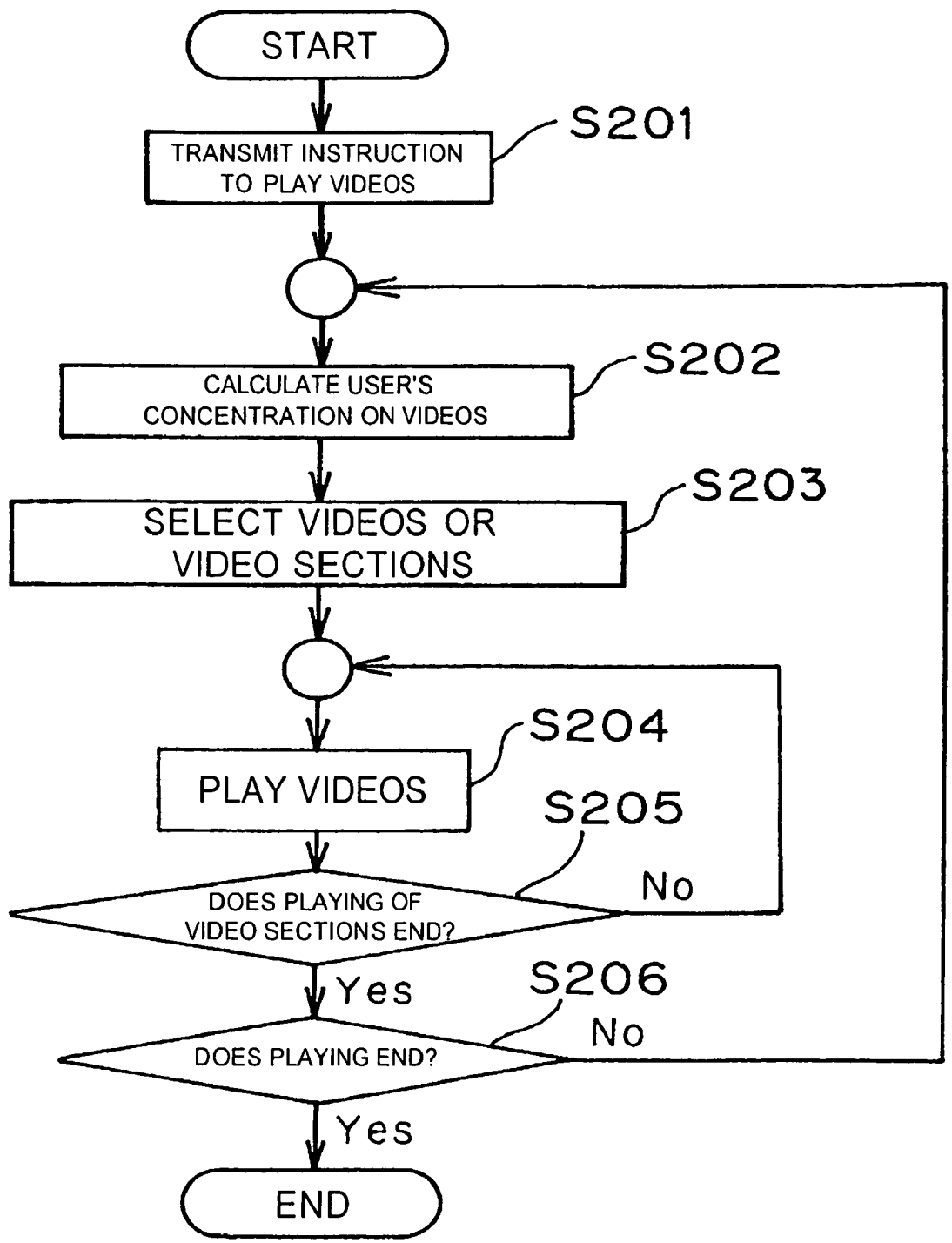
FIG. 4 is a flowchart showing an example of a video playing operation of the video playing device according to the present exemplary embodiment.

The video playing operation will next be described. FIG. 4 is a flowchart showing an example of the video playing operation of the video playing device according to the present exemplary embodiment. As shown in FIG. 4, in the present exemplary embodiment, the video playing device plays videos while selecting a video or a video section to be played according to the degree of user's concentration on the each video observed during watching.

First, the playing/stop control unit 150 transmits an instruction to start playing to the video playing unit 130 and an instruction to extract the degree of user's concentration on a video (the degree of user's concentration ratio on a video) to the user's concentration derivation unit 140 (step S201).

Figure 5:
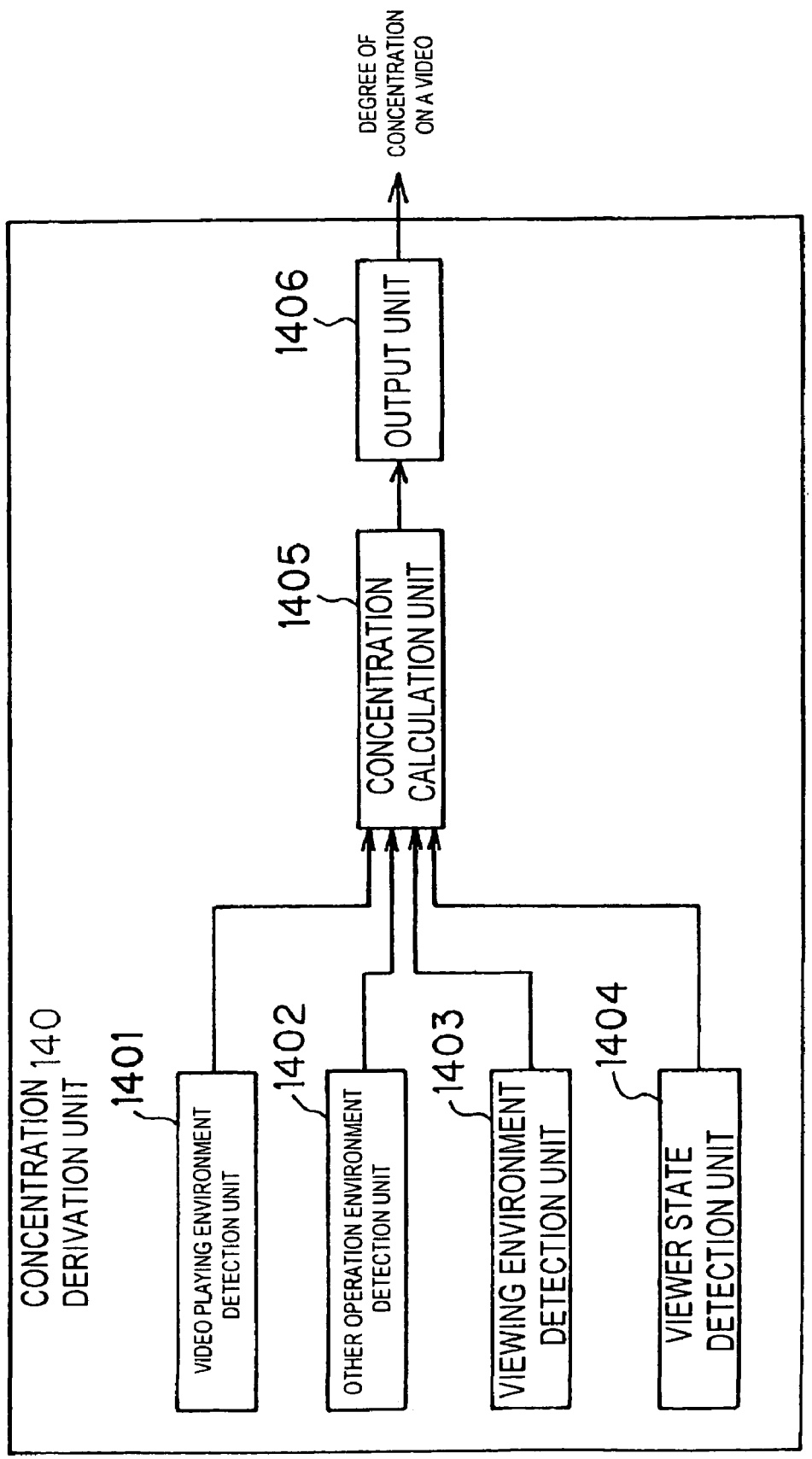
FIG. 5 is a block diagram showing an example of a configuration of user's concentration derivation unit 140.

The user's concentration derivation unit 140 calculates the degree of user's concentration on a video (step S202). FIG. 5 is a block diagram showing an example of a configuration of the user's concentration derivation unit 140. As shown in FIG. 5, the user's concentration derivation unit 140 includes a video playing environment detection unit 1401, other operation environment detection unit 1402, a watching environment detection unit 1403, a watcher state detection unit 1404, a concentration calculation unit 1405, and an output unit 1406.

The video playing environment detection unit 1401 detects an environment in which videos are played. As a specific example, the video playing environment detection unit 1401 detects a screen size, a screen position (whether a central position or a peripheral position), a playing volume and the like during video playing. The other operation environment detection unit 1402 detects environmental information on other operation such as mail creation, web browsing, gaming or watching of other videos performed in parallel to watch the video. As a specific example, the other operation environment detection unit 1402 detects types and the number of other operations performed simultaneously. Further, if the other operations are being executed by a window system, for example, the operation environment detection unit 1402 detects window sizes, window positions, and volumes during outputting sound, average key strokes if key input is made for the other operations, respectively.

The watching environment detection unit 1403 detects environmental information on a watching environment. As a specific example, watching environment detection unit 1403 detects time of playing videos, season, continuous playing time (how long the user continuously watching videos), location information, surrounding noise information and the like. The watching environment detection unit 1403 includes environment detection sensor if necessary. The watcher state detection unit 1404 detects a watcher state. Specifically, the watcher state detection unit 1404 detects a line-of-sight position (whether or not the watcher watches videos) using camera information, a fatigue degree of the user, an amount of a motion of the line of sight per unit time and the like. These are examples and the watcher state detection unit 1404 may acquire the above-stated index information using a sensor if necessary.

The concentration calculation unit 1405 integrates the information (information indicating the playing environment) detected by the video playing environment detection unit 1401, the information (information indicating the other operation environments) detected by the other operation environment detection unit 1402, the information (information indicating the watching environment) detected by the watching environment detection unit 1403, and the information (information indicating the watcher state) detected by the watcher state detection unit 1404 together, and calculates the degree of watcher's concentration on the videos. The concentration calculation unit 1405 may, for example, stores corresponding degree values of concentration in the form of a table or a mathematical expression, to outputs from the respective detection units (1401 to 1404) converts the concentration ratios into numeric numbers, and calculates the sum of the concentration ratios according to a preset weighting factor. Alternatively, the concentration calculation unit 1405 may store histories of values of respective sensors and perform a processing for adding temporal change (first derivation) to the detected values. The output unit 1406 outputs the degree of user's concentration on a video calculated by the concentration calculation unit 1405.

The video selection unit 122 selects videos or video sections to be played based on the degrees of user's video concentration on a video calculated by the user's concentration derivation unit 140 and the classification result (the degree of concentration for watching) for the each video or the each video section to be played stored in the classification result storage unit 113 (step S203). The video selection unit 122 extracts videos or video sections necessary to watch at the degree of concentration equal to or lower than the observed degree of user's concentration on a video and selects a video or a video section by comparing the current degree of user's concentration on a video with the degree of concentration for watching each of the videos or each of the video sections to be played. The video selection unit 122 outputs a video sequence of the selected videos or video sections to the video playing unit 130. If selecting one video section, for example, the video selection unit 122 may output the information indicating the start point and the end point of the video section stored in the video/section information storage unit 112 to the video playing unit 130. It is to be noted that the video selection unit 122 may set a degree of concentration serving as a reference (a degree of reference concentration) for starting a presentation order control and perform the presentation order control based on the degree of concentration only if the degree of user's concentration on a video is lower than the degree of reference concentration.

The video playing unit 130 plays the input video sequence (step S204). The video playing unit 130 continues playing until playing of the videos or the video sections selected by the video selection unit 122 ends (step S205). If the playing of the selected videos or video sections ends, video sequences to be played are repeatedly selected until playing of all the videos or all the video sections to be played ends (back to the step S202). If the playing of all the videos or all the video sections to be played ends, the video playing processing ends (step S206; Yes).

As stated so far, according to the present exemplary embodiment, when the degree of user's concentration on videos is low, the videos or the video sections for watching at the lower degree of concentration than the observed degree of concentration (the degree of user's concentration on a video) may be selectively played. Due to this, the videos or the video sections which the user may easily "watching videos while performing other operation" are preferentially selected and played. It is, therefore, possible to watch videos without disturbing understanding of contents of the videos even in a state in which the user performs other operation. Furthermore, the videos or the video sections to be played are automatically selected. Due to this, it is possible to realize more effective video watching without imposing load related to video selection and without deteriorating efficiency for other operation performed in parallel to the video watching.

Second Exemplary Embodiment

Figure 6:
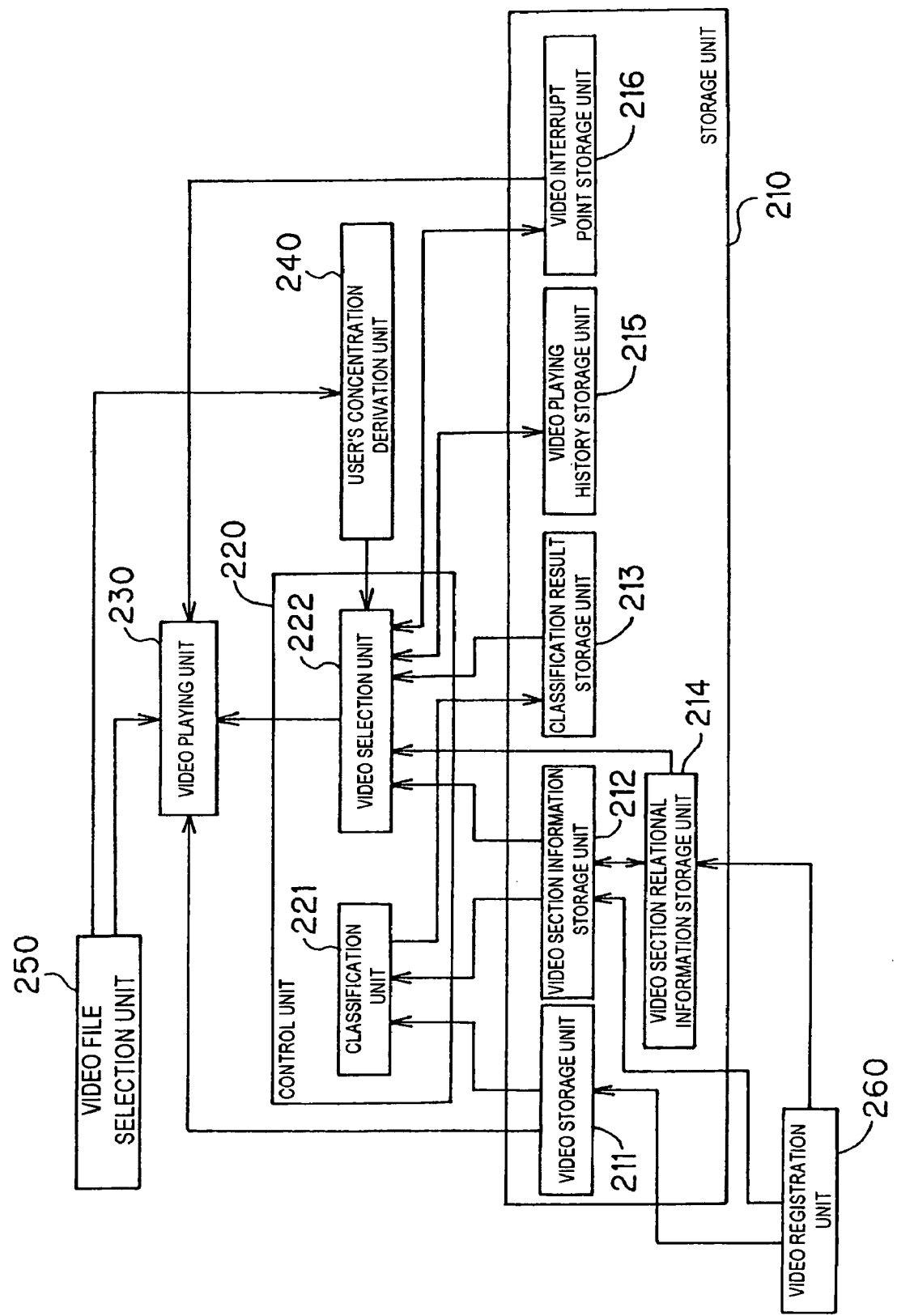
FIG. 6 is a block diagram showing an example of a configuration of a video playing device according to a second exemplary embodiment.

A second exemplary embodiment for carrying out the present invention will next be described with reference to the drawings. FIG. 6 is a block diagram showing an example of a configuration of a video playing device according to the second exemplary embodiment. The video playing device shown in FIG. 6 includes a storage unit 210, a control unit 220, a video playing unit 230, a user's concentration derivation unit 240, a video file selection unit 250, and a video registration unit 260. The storage unit 210 includes a video storage unit 211, a video/section information storage unit 212, a classification result storage unit 213, a video section relational information storage unit 214, a video playing history storage unit 215, and a video interrupt point storage unit 216. Further, the control unit 220 includes a classification unit 221 and a video selection unit 222.

As shown in FIG. 6, the video playing device according to the present exemplary embodiment differs in that the device includes the video file selection unit 250 in place of the playing/stop control unit 150 and in that the storage unit 210 further includes the video section relational information storage unit 214, the video playing history storage unit 215, and the video interrupt point storage unit 216 comparing to the first exemplary embodiment shown in FIG. 1.

In the present exemplary embodiment, an order of playing video sections is controlled while considering an operating situation of other operation when a user selects one video.

The video file selection unit 250 selects a video file to be played and indicates a playing start according to a user's operation.

The video storage unit 211 stores videos to be played as a video file. The video section relational information storage unit 214 stores video section relational information indicating a correlation such as subordination or continuity among the each video sections of video stored in the storage unit 210. The subordination means a relation required to watch two sections $\alpha$ and $\beta$ in this order if the two sections $\alpha$ and $\beta$ are present. For example, if one baseball game is divided into innings, the user may not correctly grasp a game content when the baseball game is played in opposite order of innings. Therefore, it may be defined that videos of a "second inning" is in subordination to those of a "first inning". Likewise, one drama is divided into series. If the drama is played in order of third and second series, the drama does not make sense. Therefore, it may be defined that videos of the "second" series is in subordination to those of the "first" series. Conversely, it may be defined that there is no subordination between a song section of a singer A and a song section of a singer B in a music program. Similarly, it may be defined that there is no subordination among each of corners of a variety program, respective news, comic backchats and the like.

It is preferably defined that there is a subordination not only among continuous video sections but also an instance having a subordination semantically such as a question section and an answer section of a quiz or a trailer section and a main part section of a drama. Whether or not there is a semantical subordination may be detected when keywords (question and answer, trailer and main part or the like) having subordination were defined in advance, analyze videos or metadata of the videos, and the defined keywords are used in a predetermined order. The video playing history storage unit 215 stores playing histories of video files. The video interrupt point storage unit 216 stores interrupt points of video playing in each video file currently being played.

In the present exemplary embodiment, the video selection unit 222 decides video sections to be played from each of the video sections included in the videos to be played based on the video/section information stored in the video/section information storage unit 212, the classification result information (the degree of concentration for watching) on each of the video sections stored in the classification result storage unit 213, the degrees of user's concentration on a video calculated by the user's concentration derivation unit 240, the video section relational information stored in the video section relational information storage unit 214, and the playing histories stored in the video playing history storage unit 215. The video selection unit 222 may compare the value of a current degree of user's concentration on a video with the value of the degree of concentration for watching each video section stored in the classification result storage unit 213 while monitoring the degrees of user's concentration on a video output from the user's concentration derivation unit 240, select candidate sections, evaluate the relation of the candidate sections with the currently playing video section and past playing histories, and decide video sections to be played.

Further, the video playing unit 230 replays a video file indicated by the video file selection unit 250 and stored in the storage unit 211 according to the video sections selected by the video selection unit 222. The video registration unit 260 registers information on the video file to be played, videos of the video files and video sections of the videos. In the present exemplary embodiment, the video registration unit 260 stores the video file to be played in the video storage unit 211, and registers video/section information including metadata of the videos to be played and metadata of the video sections in the video/section information storage unit 212. The video registration unit 260 also registers video section relational information in the video section relational information storage unit 214.

The video/section information is not limited to information provided by a video provider to accompany video but may be dynamically calculated by causing the video registration unit 260 to read and analyze the video file stored in the video storage unit 211. Likewise, the video section relational information is not limited to information provided by the video provider to accompany video section but may be automatically generated by causing the video registration unit 260 to read and analyze the video file stored in the video storage unit 211 and the video/section information stored in the video/section information storage unit 212. In another alternative, both the video/section information and the video section relational information may be manually defined by an editor or a user using an edit function. The other respects are similar to the first exemplary embodiment.

Figure 7:
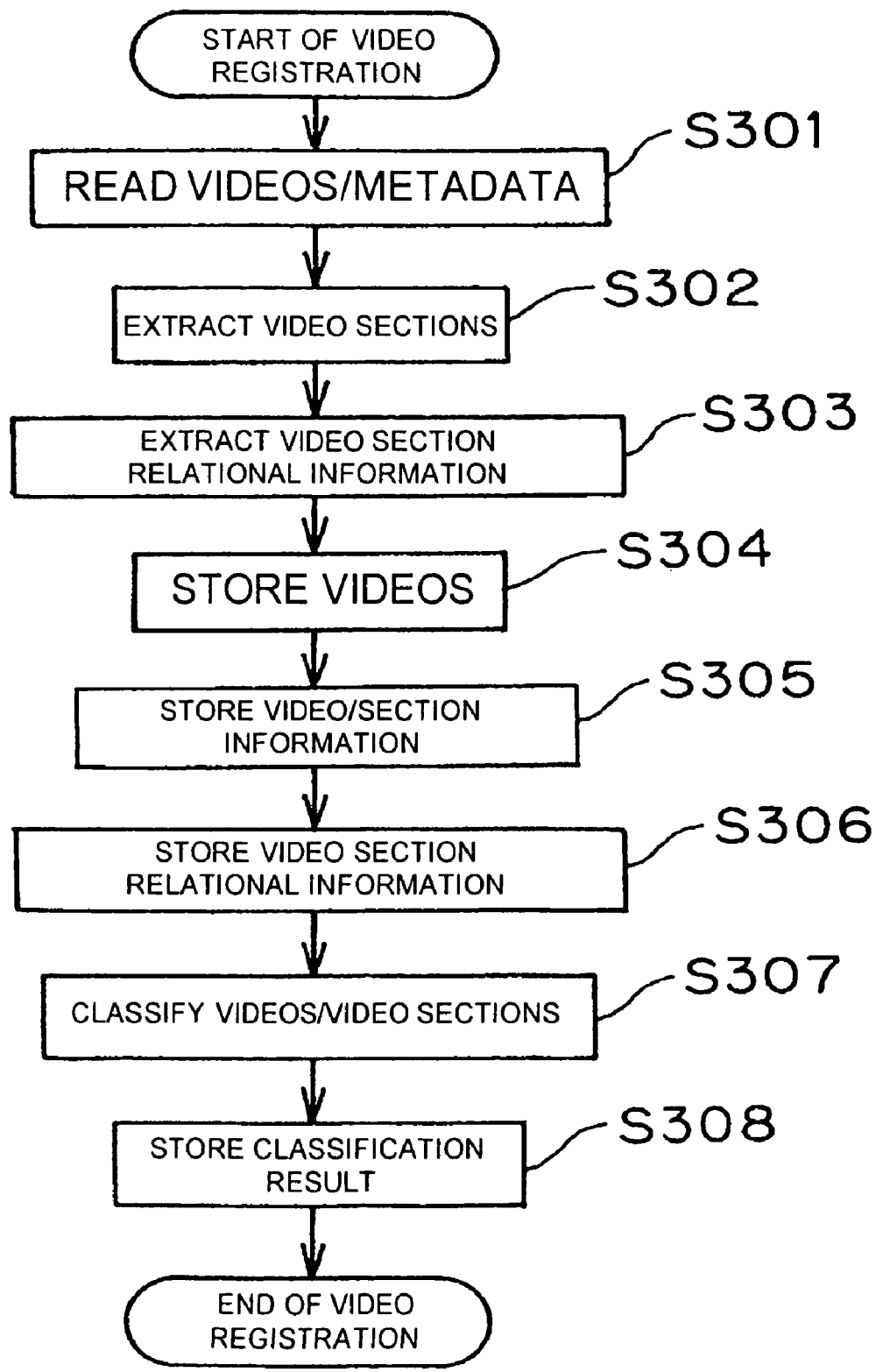
FIG. 7 is a flowchart diagram showing an example of a video registration operation according to the second exemplary embodiment.

Operation according to the present exemplary embodiment will be described. Similarly to the first exemplary embodiment, the operation according to the present exemplary embodiment is roughly divided into two operations of a video registration operation and a video playing operation. The video registration operation will first be described. FIG. 7 is a flowchart showing an example of the video registration operation according to the present exemplary embodiment.

As shown in FIG. 7, first, the video registration unit 260 reads videos and metadata accompanying the videos (step S301). As for the videos, the video registration unit 260 receives broadcast signals via, for example, an antenna, a receiver circuit, and a decoder. Further, the video registration unit 260 receives video signals via, for example, the Internet. The video registration unit 260 reads a video file output from, for example, a video camcorder. The video registration unit 260 also reads metadata if the metadata accompanying video is present.

Next, the video registration unit 260 divides the read videos into series of sequences and extracts video sections if necessary (step S302). The video registration unit 260 extracts the video sections by, for example, dividing the videos into shots using continuity or discontinuity of signal features. Alternatively, the video registration unit 260 may extract the video sections by, for example, a method including detecting a visual effect such as fade/wipe from the videos and setting the detected visual effect as a switch of a scene, a method including analyzing voice in the videos and setting a location where the voice changes semantically as a boundary, a method including dividing the videos into shots based on script information added to the video or the like, or a method using section information such as chapters or captures added to each of the videos in advance.

The video registration unit 260 extracts the video section relational information including the subordination among each of the video sections based on the read or generated metadata on each of the video sections and temporal continuity of the video sections (step S303). The video registration unit 260 extracts, for example, a hierarchical structure from the video information and adds information indicating presence of the subordination in time series to the video sections belonging to the same chapter. As a method of extracting the hierarchical structure from the video information, a method including detecting and using the visual effect of the videos, a method using script information, a method based on semantical separation using voice recognition and video recognition, a method based on manual operation by the editor or user or the like may be considered.

Next, the video registration unit 260 registers the read videos in the video storage unit 211 (step S304). Further, the video registration unit 260 registers the metadata read or generated to accompany the videos registered in the video storage unit 211 in the video/section information storage unit 212 as the video/section information (step S305). If the video sections are extracted, the video registration unit 260 registers a start point and an end point of the video sections in the video/section information storage unit 212. The video registration unit 260 also registers the video section relational information including the subordination of each of the video sections in the video section relational information storage unit 214 (step S306).

Next, the classification unit 221 classifies each of the video sections of the video registered in the video storage unit 211 by the video registration unit 260 according to the degree of concentration for watching (step S307). The classification unit 221 calculates the degree of concentration for watching each of the video sections of the videos based on the videos registered in the video storage unit 211, information on the videos and the video sections of the videos registered in the video/section information storage unit 212, and classifies the videos or the video sections of each of the videos according to the calculated degrees of concentration for watching. Since a configuration and an operation of the classification unit 221 are similar to the classification unit 121 according to the first exemplary embodiment shown in FIG. 3, they will not be repeated herein.

The classification result storage unit 213 stores the degree of concentration for watching each of the video sections output from the classification unit 221 (step S308).

Figure 8:
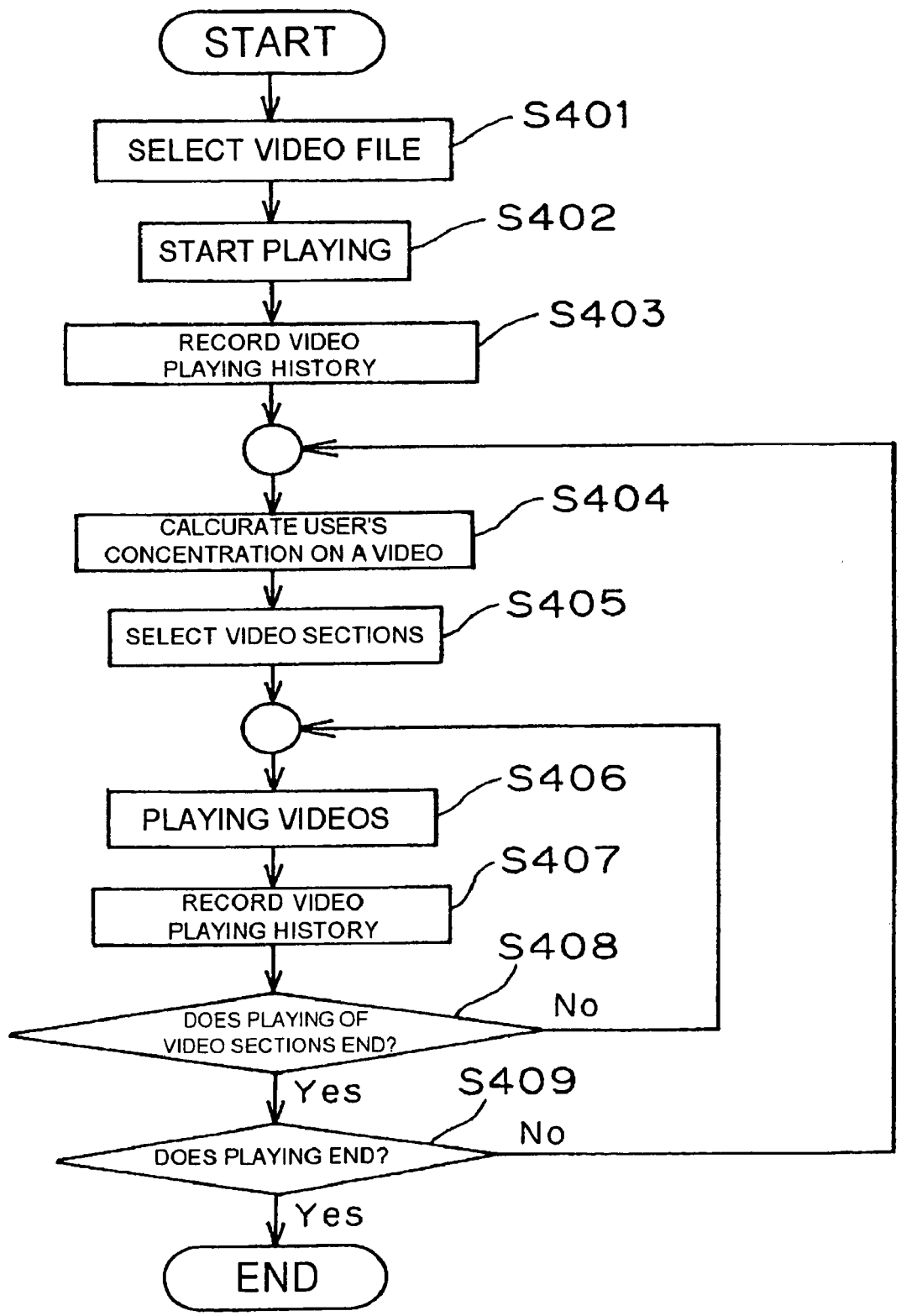
FIG. 8 is a flowchart showing an example of a video playing operation according to the second exemplary embodiment.

The video playing operation will next be described. FIG. 8 is a flowchart showing an example of the video playing operation according to the present exemplary embodiment.

As shown in FIG. 8, first, the video file selection unit 250 selects a video file to be played according to a user's operation (step S401), transmits an instruction to start replay to the video playing unit 230 and an instruction to extract the degree of user's concentration on a video (the degree of user's concentration on a video) to the user's concentration derivation unit 240 (step S402).

In this case, the video playing unit 230 starts playing the videos at a first video section of the selected video file (step S403). Further, the video playing unit 230 registers information indicating the currently playing video section as a playing history in the video playing history storage unit 215 (step S403).

The user's concentration derivation unit 240 calculates the degree of user's concentration on a video (step S404). Since a configuration and an operation of the user's concentration derivation unit 240 are similar to those of the user's concentration derivation unit 140 according to the first exemplary embodiment shown in FIG. 5, they will not be repeated herein.

The video selection unit 222 selects video sections to be played next based on the degree of user's concentration on a video calculated by the user's concentration derivation unit 240, the classification result of (the degree of concentration for watching) each video section to be played stored in the classification result storage unit 213, the relational information between the currently playing video section and the selected video sections stored in the video section relational information storage unit 214 and the like (step S405).

The video selection unit 222 extracts video sections (hereinafter, referred to as "playing video section candidates") necessary to watch at the degree of concentration equal to or lower than the degree of user's concentration on a video by comparing the current degree of user's concentration on a video with the classification result information (the degree of concentration for watching) on each of the video sections to be played. The video selection unit 222 selects video sections to be played from among the playing video candidate sections based on the subordination and continuity between the currently playing video section and the playing video section candidate stored in the video section relational information storage unit 214, the playing histories stored in the video playing history storage unit 215, and information on the interrupt points stored in the video interrupt point storage unit 216, and outputs a video sequence of the selected video sections to the video playing unit 230. The video selection unit 222 may output the information indicating the start point and the end point of video section stored in the video/section storage unit 212 to the video playing unit 230.

The video playing unit 230 plays the input video sequence (step S406). The video playing unit 230 also registers the playing histories of the played video sections in the video playing history storage unit 215 (step S407) It is to be noted that the video selection unit 222 may register the playing histories in the video playing history storage unit 215. The video playing unit 230 continues playing until playing of the video sections selected by the video selection unit 222 ends (step S408). If the playing of the selected video sections ends, video sections to be played are repeatedly selected until playing of all the video sections to be played ends (back to the step S404). If the playing of all the video sections to be played ends, the video playing processing ends (step 409; Yes).

Figure 9:
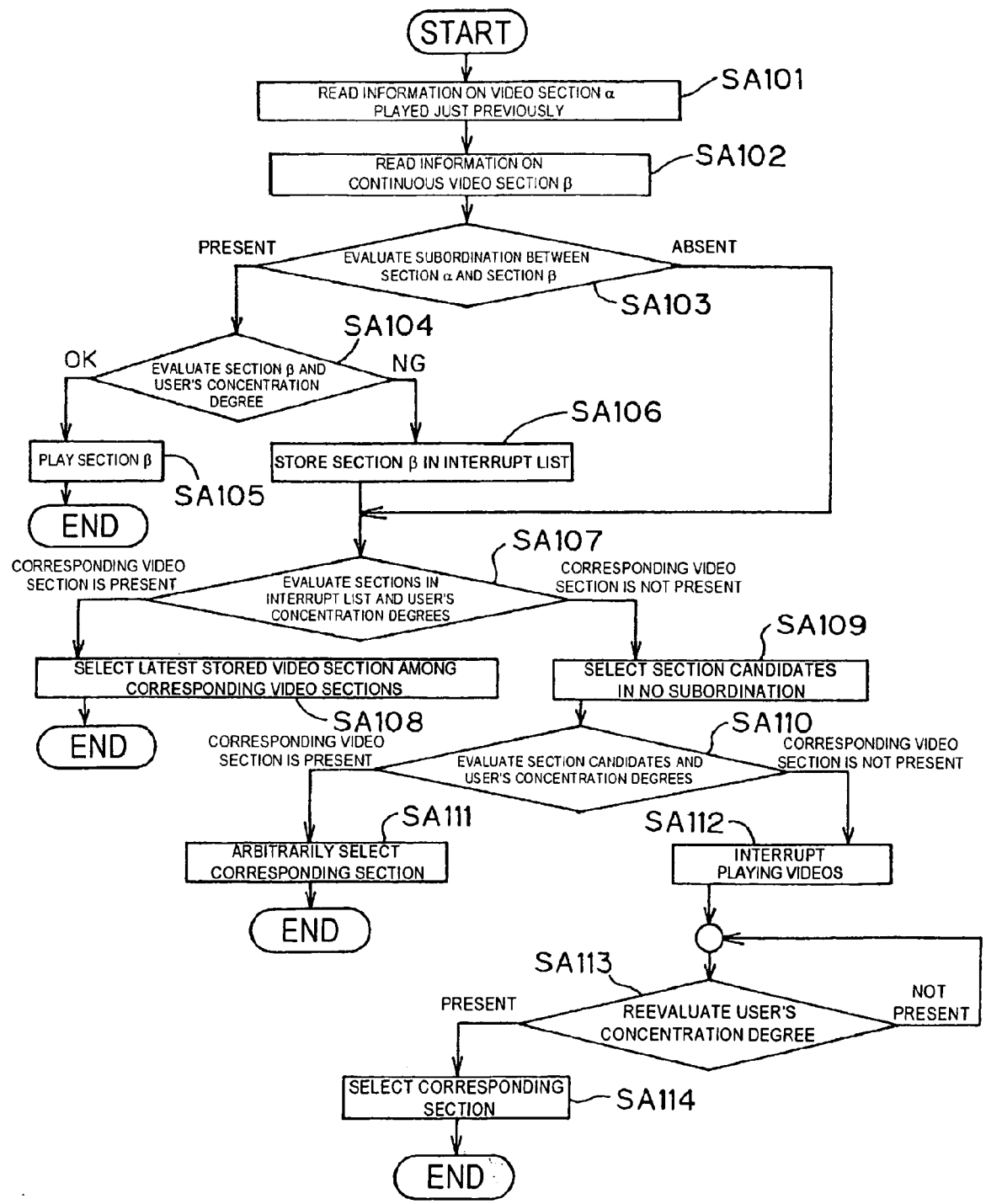
FIG. 9 is a flowchart showing an example of a video section selection operation performed by a video selection unit 222.

FIG. 9 shows an example of a flow of video section selection performed by the video selection unit 222. As shown in FIG. 9, the video selection unit 222 reads the classification result and the video section relational information on the video section played just previously (hereinafter, referred to as "video section α") (step SA101). The video selection unit 222 also reads the classification result and the video section relational information on the video section temporally continuous to the video section a (hereinafter, referred to as "video section β") (step SA102). The video selection unit 222 makes a subordination evaluation between the video section α and the video section β (step SA103).

If the subordination indicating that the video sections α and β are to be played continuously is present between the video sections α and β (step SA103; Present), the video selection unit 222 compares the current degree of user's concentration on a video calculated by the user's concentration derivation unit 240 with the classification result information (the available degree of concentration) on the video section β. If the current degree of user's concentration on a video satisfies the available degree of concentration for the video section β (step SA104; OK), the video selection unit 222 selects the video section β as the video section to be played and ends the processing (step SA105).

On the other hand, if the current degree of user's video concentration on a video does not reach the degree of concentration necessary to watch at which the video section β may be watched (step SA104; NG), that is, the degree of user's concentration on videos is lower than the degree of concentration necessary to watch the video section β, the video selection unit 222 determines that the video section β is not necessary to watch and records information for identifying the video section β in the video interrupt point storage unit 216 (step SA106).

Next, the video selection unit 222 compares video sections interrupted so far, that is the available usable degree of concentration on all the video sections stored in the video playing history storage unit 215 with the degrees of user's concentration on a video to evaluate whether there is a video section necessary to watch at the current degree of user's concentration on a video (step SA107). If a corresponding video section is present, the video selection unit 222 selects one video section from among the interrupted video sections (step SA107; corresponding video section is present, and step SA108). The video selection unit 222 may select a video section latest stored in the video playing history storage unit 215.

If no corresponding video section is present, the video selection unit 222 refers to playing histories stored in the video playing history storage unit 215 detects video sections that are not played so far, that are not in semantically subordination to the video sections stored in the video interrupt point storage unit 216, and that are not in temporally subordination to the other video sections (for example, video sections corresponding to a start of a chapter) as section candidates (step SA109).

The video selection unit 222 compares the current degree of user's concentration on the detected section candidates with the degrees of concentration for watching the detected section candidates and evaluates whether there is a video section necessary to watch at the current degree of user's concentration on a video (step SA110). If a corresponding video section is present, the video selection unit 222 selects one video section from among the detected section candidates (step SA110; corresponding video section is present, and step SA111). If no corresponding video section is present, the video playing is interrupted (step SA112). The interruption is maintained until the degree of user's concentration on a video is redetected at predetermined timing and the degree of user's concentration on a video reaches a degree of concentration necessary for watching any one of the video section β, the video sections interrupted so far and the section candidates in no subordination to the interrupted video sections (step SA113). If the degree of user's concentration on a video improves and satisfies the degree of concentration for watching one of the detected section candidates, the video selection unit 222 selects the video section satisfying the degree of concentration for watching as a video section to be played and ends the processing (step SA114).

If the subordination indicating that the video sections α and β are to be continuously played is not present between the video sections α and β (step SA103; not present), the video selection unit 222 searches an interruption list stored in the video interrupt point storage unit 216 so as to preferentially reproduce the interrupted video sections (go to step SA107).

The flow of the playing video selection processing described above is only an example and the other video section may be selected in place of interruption in the step SA112. For example, the video selection unit 222 may select a video section for which the degree of concentration for watching is lowest among the video sections currently compared.

As stated so far, according to the present exemplary embodiment, a presentation order control unit preferentially playing video sections necessary to watch at lower degree of concentration than the observed degree of concentration (the degree of user's video concentration) while considering the temporal/semantical continuity even if the degree of user's concentration on the video is low when playing videos selected by the user may be realized. Therefore, the user may watch videos without disturbing understanding of contents of the videos even in a state in which the user is performing other operation. Furthermore, the video sections for which not so high degrees of concentration are not necessary are played when the user concentrates on other operation, thereby lessening load on other operation. If the degree of video concentration increases, videos for which higher degrees of concentration are necessary are automatically played accordingly, thereby making it possible to effectively watch videos.

Third Exemplary Embodiment

Figure 10:
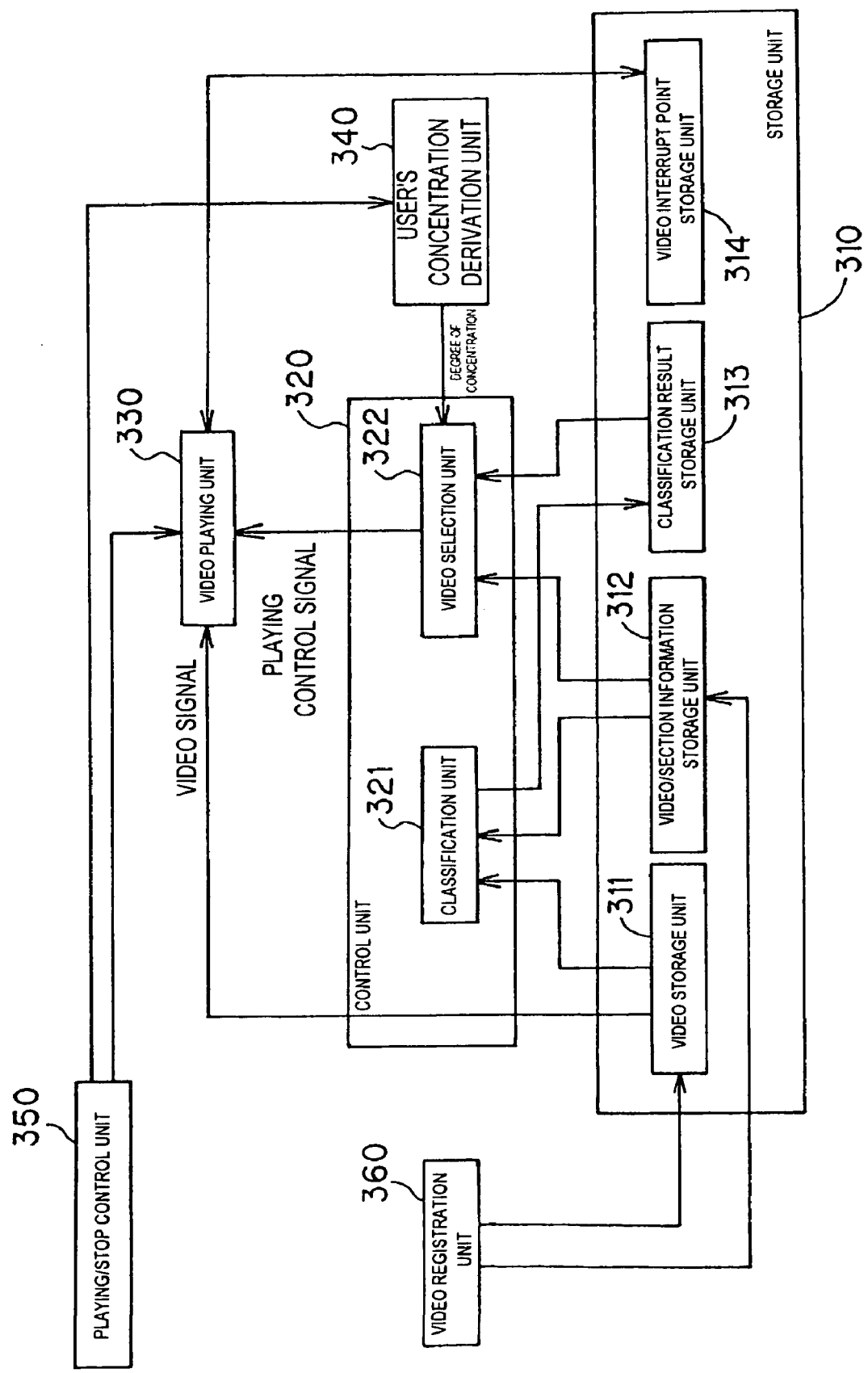
FIG. 10 is a block diagram showing an example of a configuration of a video playing device according to a third exemplary embodiment.

A third exemplary embodiment for carrying out the present invention will next be described with reference to the drawings. FIG. 10 is a block diagram showing an example of a configuration of a video playing device according to the third exemplary embodiment. The video playing device shown in FIG. 10 includes a storage unit 310, a control unit 320, a video playing unit 330, a user's concentration derivation unit 340, a playing/stop control unit 350, and a video registration unit 360. The storage unit 310 includes a video storage unit 311, a video/section information storage unit 312, a classification result storage unit 313, and a video interrupt point storage unit 314. The control unit 320 includes a classification unit 321 and a video selection unit 322.

As shown in FIG. 10, the video playing device according to the present exemplary embodiment differs in that the storage unit 310 includes the video interrupt point storage unit 314 compare to the first exemplary embodiment shown in FIG. 1.

In the present exemplary embodiment, if the degree of user's concentration on the video is lowered, a control for interrupting playing videos or video sections is performed.

The video interrupt point storage unit 314 stores a video playing interrupt point in a currently played video or video section.

In the present exemplary embodiment, the video selection unit 322 decides videos or video sections to be played from among the videos or the video sections to be played based on the video/section information stored in the video/section information storage unit 312, the classification information (the degree of concentration for watching) of each of the videos or each of the video sections stored in the classification result storage unit 313, the degrees of user's concentration calculated by the user's concentration derivation unit 340, and the interrupt points stored in the video interrupt point storage unit 314. Further, the video selection unit 322 decides whether to interrupt video playing or not based on the degree of user's concentration during replay. The other respects are similar to the first exemplary embodiment.

Figure 11:
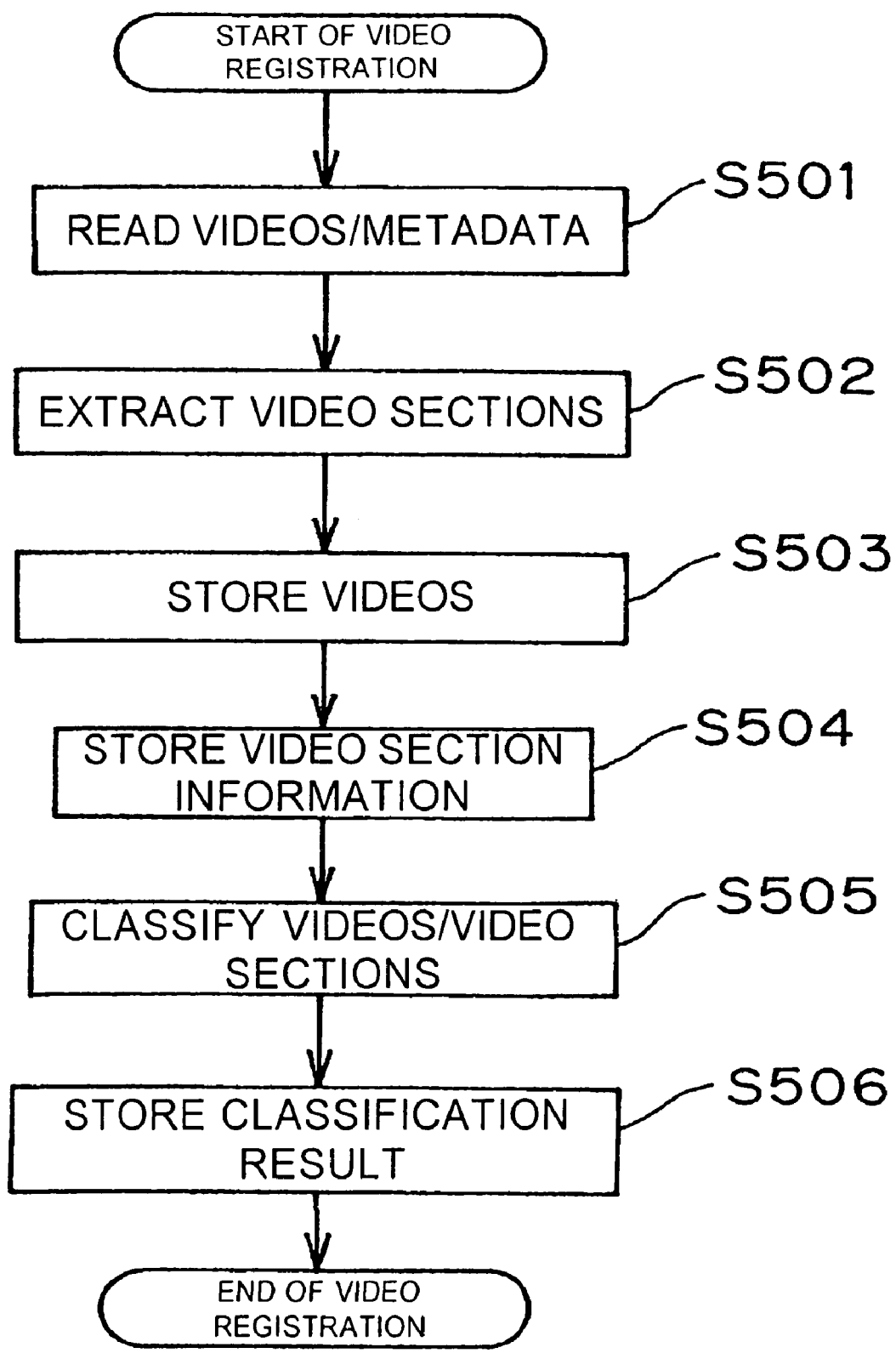
FIG. 11 is a flowchart showing an example of a video registration operation according to the third exemplary embodiment.

Operation according to the present exemplary embodiment will next be described. Similarly to the first exemplary embodiment, the operation according to the present exemplary embodiment is roughly divided into two operations of a video registration operation and a video playing operation. The video registration operation will first be described. FIG. 11 is a flowchart showing an example of the video registration operation according to the present exemplary embodiment. The video registration operation according to the present exemplary embodiment is basically similar to that according to the first exemplary embodiment.

First, the video registration unit 360 reads videos and metadata accompanying the videos (step S501). As for videos, the video registration unit 360 receives, for example, broadcast signals via an antenna, a receiver circuit, and a decoder. Further, the video registration unit 360 acquires video signals via, for example, the Internet. The video registration unit 360 also reads video files output, for example, from a video camcorder. The video registration unit 360 further reads metadata if the metadata accompanying video is present.

Next, the video registration unit 360 divides the read videos into series of sequences and extracts video sections if necessary (step S502). The video registration unit 360 extracts video sections by, for example, dividing the videos into shots using continuity or discontinuity of signal features. Alternatively, the video registration unit 360 may extract the video sections by, for example, a method including detecting a visual effect such as fade/wipe from the videos and setting the detected visual effect as a switch of a scene, a method including analyzing voice in the videos and setting a location where the voice semantically changes as a boundary, a method including dividing the videos into shots based on script information added to the video or the like, or a method using section information such as chapters or captures added to each of the videos in advance.

The video registration unit 360 registers the read videos in the video storage unit 311 (step S503). Further, the video registration unit 360 registers the metadata read or generated to accompany the videos registered in the video storage unit 311 in the video/section information storage unit 312 as the video/section information (step S504). If the video sections are extracted, the video registration unit 360 registers a start point and an end point of the video sections in the video/section information storage unit 312.

Next, the classification unit 321 classifies the videos or each of the video sections of the videos registered in the video storage unit 311 by the video registration unit 360 according to the degree of concentration for watching (step S505). The classification unit 321 calculates the degree of concentration for watching the videos or each of the video sections of the videos based on the videos registered in the video storage unit 311, information on the videos and the each of video sections of the videos registered in the video/section information storage unit 312, and classifies the videos or each of the video sections of the videos according to the calculated degree of concentration for watching. Since a configuration and an operation of the classification unit 321 are similar to the classification unit 121 according to the first exemplary embodiment shown in FIG. 3, they will not be repeated herein.

The classification result storage unit 313 stores the degree of concentration for watching the videos or each of the video sections output from the classification unit 321 (step S506).

Figure 12:
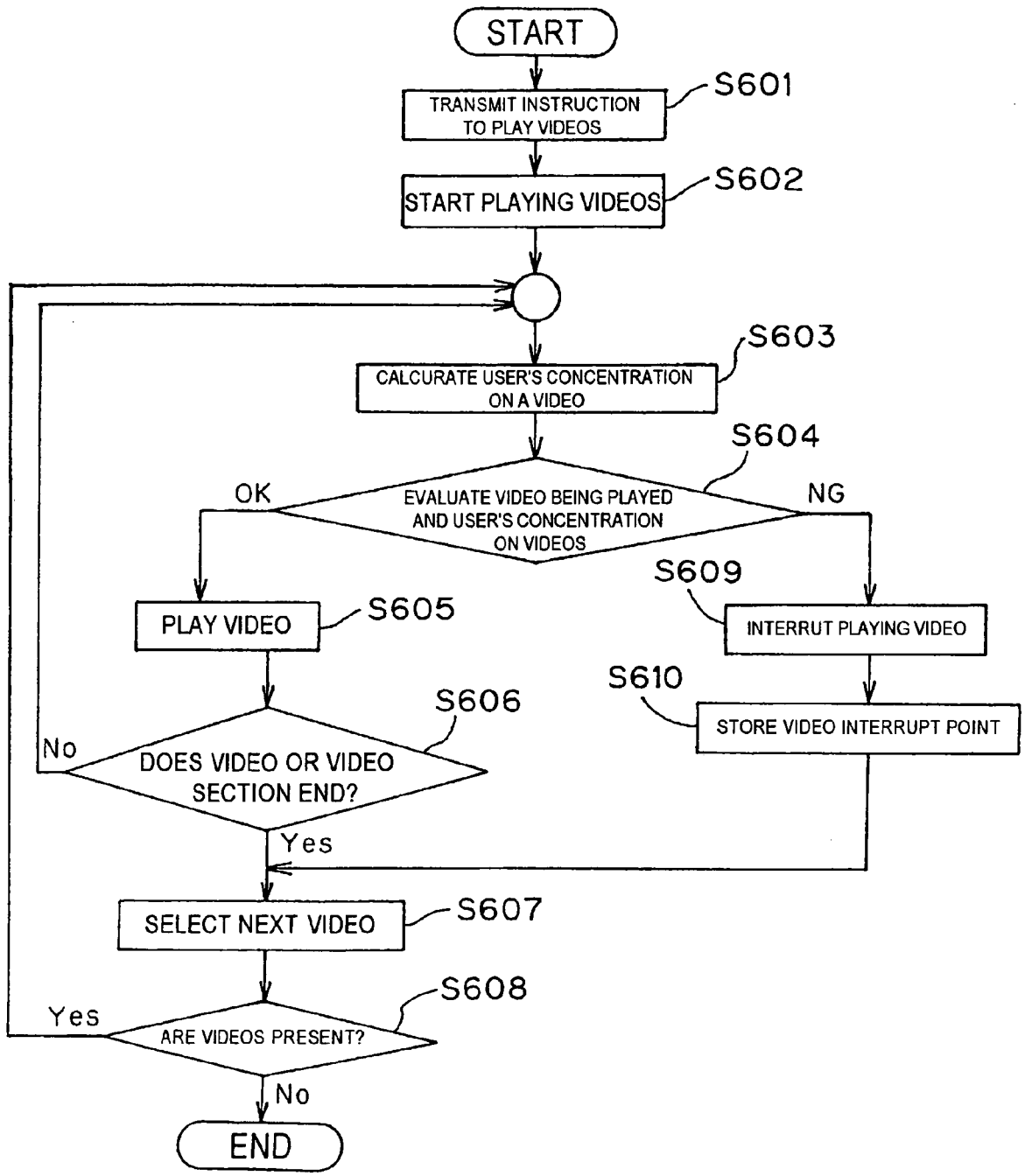
FIG. 12 is a flowchart showing an example of a video playing operation according to the third exemplary embodiment.

The video playing operation will next be described. FIG. 12 is a flowchart showing an example of the video playing operation according to the present exemplary embodiment.

As shown in FIG. 12, first, the playing/stop control unit 350 transmits an instruction to start playing to the video playing unit 330 and an instruction to extract the degrees of user's concentration on videos (the degrees of user's concentration on videos) to the user's concentration derivation unit 340 (step S601).

In this case, the video playing unit 330 starts playing of the instructed videos or the video sections (step S602). The user's concentration derivation unit 340 calculates the degrees of user's concentration on videos (step S603). Since a configuration and an operation of the user's concentration derivation unit 340 are similar to those of the user's concentration derivation unit 140 according to the first exemplary embodiment shown in FIG. 5, they will not be repeated herein.

The video selection unit 322 determines interruption of playing or videos to be played based on the observed degree of user's concentration on the video and the degree of concentration necessary to watch (the degree of concentration for watching) the video or the video section being played. The video selection unit 322 compares the degree of user's concentration on a video calculated by the user's concentration derivation unit 340 with the classification result (the degree of concentration for watching) of the video being played stored in the classification result storage unit 313 (step S604). If the current degree of user's video concentration satisfies the degree of concentration for watching the video or the video section being played (step S604; OK), video playing continues (step S605). Detection and evaluation of the degrees of user's concentration on videos are repeated until end of playing (step S606; No, back to step S603).

If playing ends, the video selection unit 322 selects videos to be played next based on the interrupt points stored in the video interrupt point storage unit 314, or from among new videos, and outputs a video sequence of the selected videos to the video playing unit 330 (step S607). Similarly to the above, the video selection unit 322 repeatedly evaluates the degree of user's concentration on a video until playing ends. If videos to be played next are not present, the video playing processing ends (step S608; No).

On the other hand, if the current degree of user's concentration on a video does not reach the degree of concentration necessary to watch the video or the video section being played (step S604; NG), that is, the degree of user's concentration on a video is lower than the degree of concentration for watching the video or the video section being played, then the video selection unit 322 transmits an instruction to the playing/stop control unit 350 to interrupt playing (step S609). Further, the video selection unit 322 stores an interrupt point in the video interrupt point storage unit 314 (step S610) and selects a video to be played next (back to step S607).

Figure 13:
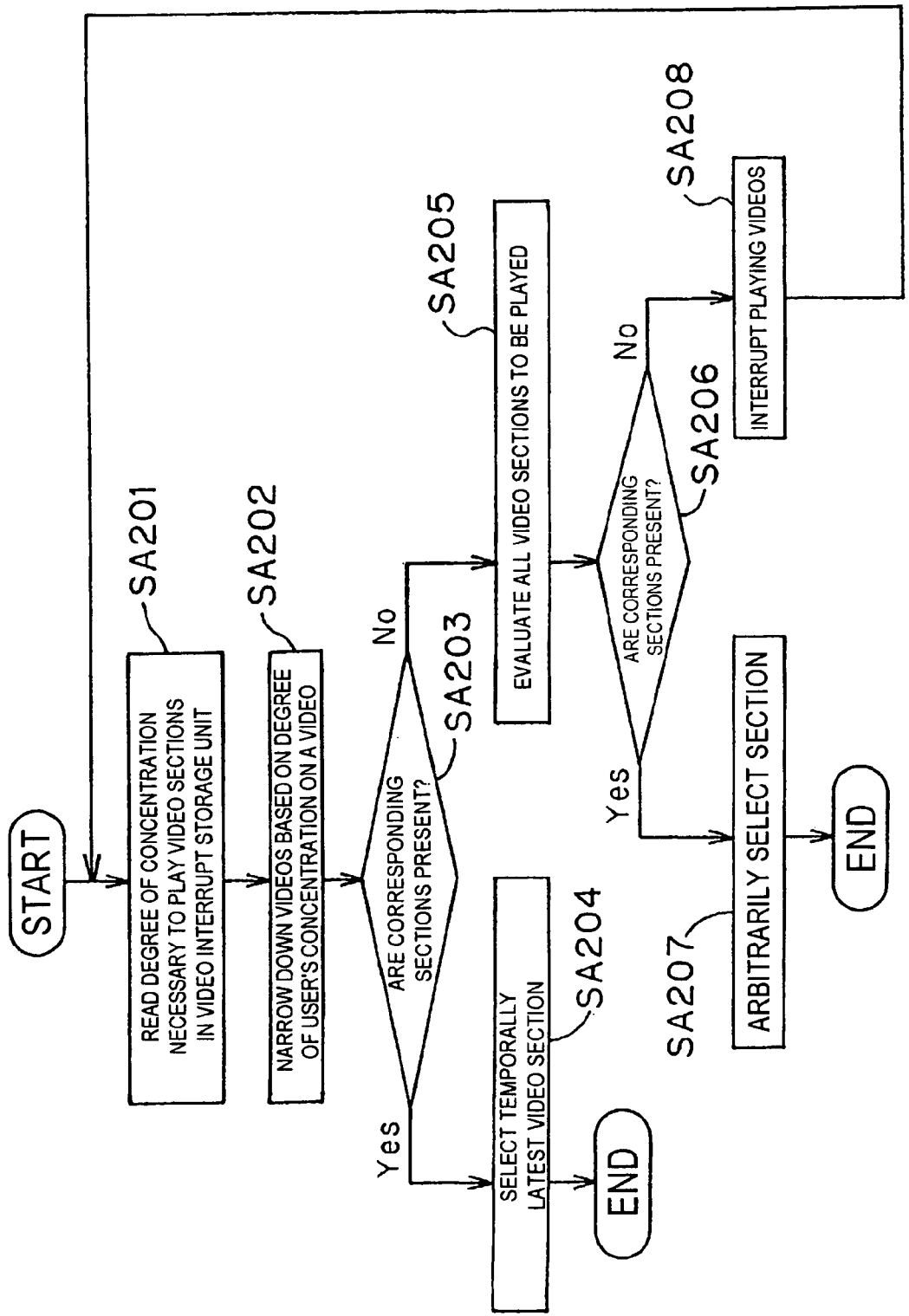
FIG. 13 is a flowchart showing an example of a reproduction video selection operation performed by a video selection unit 322.

FIG. 13 shows an example of a flow of a played video section selection processing in the step S607. First, if the interrupt points are stored in the video interrupt point storage unit 314, the video selection unit 322 reads the degrees of concentration for watching the videos or the video sections including the stored interrupt points from the classification result storage unit 313 (step SA201). Further, the video selection unit 322 narrows down each of the videos or each of the video sections interrupted so far based on the current degree of user's concentration on a video (step SA202). The video selection unit 322 compares the current degree of user's concentration with the degrees of concentration for watching each of the videos or each of the video sections including each of the interrupt points stored in the video interrupt point storage unit 314, and extracts video sections at the interrupt points necessary to watch at the current degree of user's concentration on a video as candidate sections.

In this case, if corresponding sections are present, the video selection unit 322 selects a temporally latest video section from among the extracted sections as a video section to be played and ends the processing (step SA203; Yes, SA204) If corresponding sections are not present, the video selection unit 322 evaluates all the videos or all the video sections available to be played based on the degree of user's concentration on a video and selects video sections to be played (step SA203; No, SA205). If the corresponding video sections are present, the video selection unit 322 selects one of the corresponding video sections and ends the processing (step SA206; Yes, SA207). If the corresponding video sections are not present, the video selection unit 322 interrupts playing videos (step SA208). After interruption, the video selection unit 322 observes the degree of user's concentration on a video again and repeatedly evaluates the videos or the video sections based on the degree of user's concentration until the degree of user's concentration on a video lowered to detect a corresponding section or until the user interrupts playing videos (back to step SA201).

It is to be noted that the selection operation shown in FIG. 13 is an example and when a lowering in the degree of user's concentration on a video is observed, a method including instantly interrupting playing, a method including interrupting playing after playing videos for a while, a method including interrupting playing after finishing a video section may be considered. Further, to select one video section if a plurality of video sections is set as candidates, several criterions such as selection based on time and selection based on the importance level of the video may be introduced.

As stated so far, according to the present exemplary embodiment, if the degree of concentration for a video is lowered and became difficult to understand the video during playing video selected by the user, it is possible to interrupt playing video sections not only during playing of the video sections, thereby making it possible to further accelerate understanding videos.

Fourth Exemplary Embodiment

Figure 14:
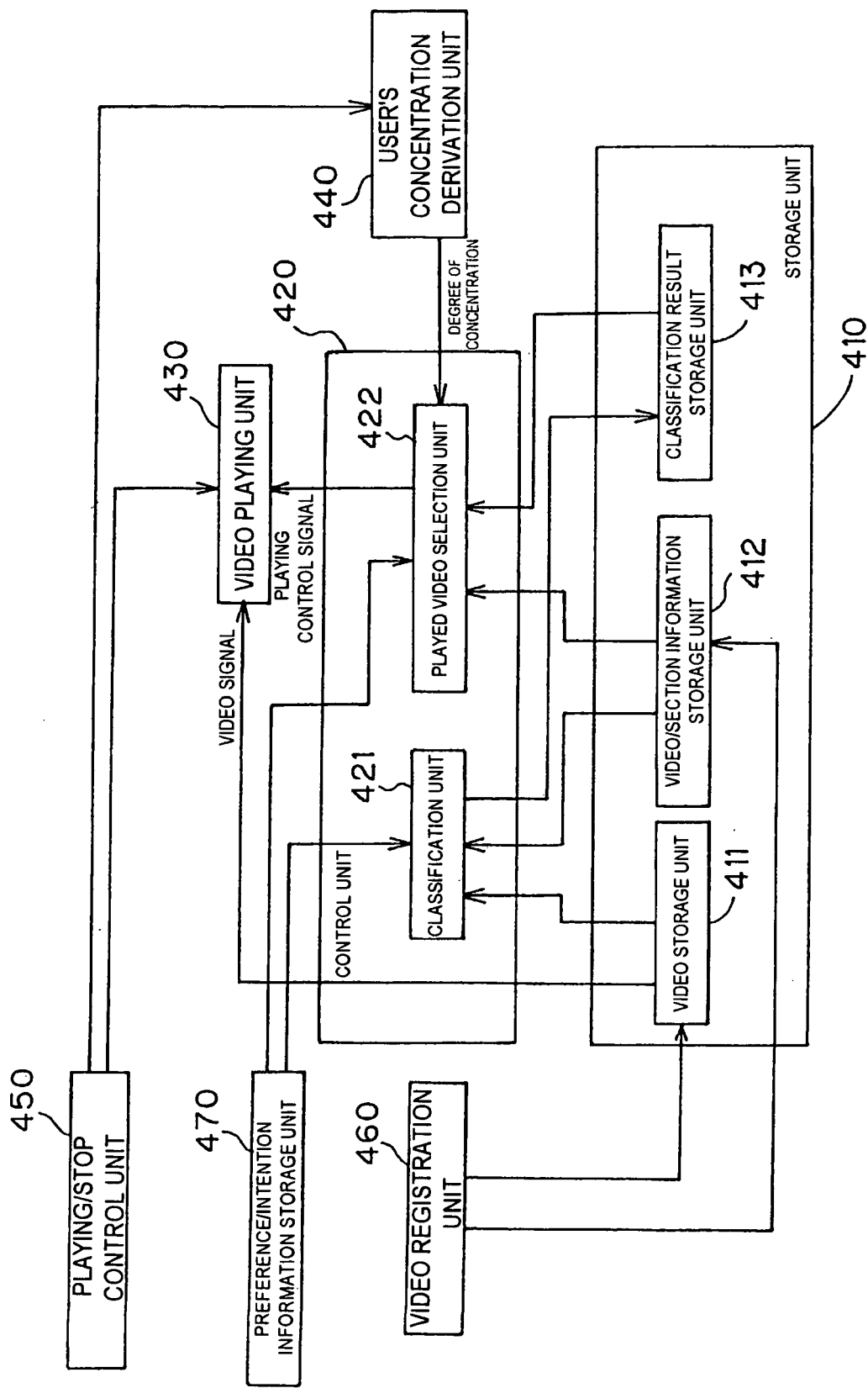
FIG. 14 is a block diagram showing an example of a configuration of a video playing device according to a fourth exemplary embodiment.

A fourth exemplary embodiment for carrying out the present invention will be described with reference to the drawings. FIG. 14 is a block diagram showing an example of a configuration of a video playing device according to the fourth exemplary embodiment. The video playing device shown in FIG. 14 includes a storage unit 410, a control unit 420, a video playing unit 430, a user's video concentration derivation unit 440, a playing/stop control unit 450, a video registration unit 460, and a preference/intention information storage unit 470. The storage unit 410 includes a video storage unit 411, a video/section information storage unit 412, and a classification result storage unit 413. The control unit 420 includes a classification unit 421 and a played video selection unit 422.

As shown in FIG. 14, the video playing device according to the present exemplary embodiment differs in that the video playing device further includes the preference/intention information storage unit 470 comparing to the first exemplary embodiment shown in FIG. 1.

The preference/intention information storage unit 470 stores information on a preference and an intention of the user. The preference/intention information storage unit 470 stores, for example, a user's preference (such as a genre interesting the user) estimated from keywords input by the user or past watching histories or a user's intention (such as an intention to watch videos thoroughly or an intention to watch videos briefly). The information stored in the preference/intention information storage unit 470 will be referred to as "preference/intention information" hereinafter. The preference/intention information stored in the preference/intention information storage unit 470 may be input by user or automatically calculated from the past watching histories or the like. Furthermore, the preference/intention information storage unit 470 may be a dedicated storage device or a storage medium similar to the storage unit 410.

In the present exemplary embodiment, the classification unit 421 calculates the degree of concentration for watching each of the videos or each of the video section of the videos stored in the video storage unit 411 based on the video information stored in the video storage unit 411, the video/section information stored in the video/section information storage unit 412, and the preference/intention information stored in the preference/intention information storage unit 470, and classifies the videos or the video sections based on the calculated degrees of concentration for watching. As an example of classification, classification may be made by analyzing media information such as the number of characters on tickers presented per unit time in videos or video sections, the number of output voices, and quantities of motions of objects, and calculating the degrees of concentration for watching from complexity of the media information. Alternatively, the videos or the video sections may be classified by analyzing videos and voices to thereby extract semantic information on a relevant video section, and evaluate an importance level (semantic importance) in the entire videos to set the evaluated importance level as the degree of concentration for watching. To evaluate the semantic importance level of the video section, metadata such as an annotation (comments) manually added by a video creator or a video registrant may be used.

In another alternative, the degrees of concentration for watching may be calculated based on a coincidence between the user's preference may be estimated from keywords or the like registered by the user in advance and a video or a video section to be evaluated. It is to be noted that the classification unit 421 may use not only a method including calculating the degree of concentration for watching from these pieces of information (such as the media information, the semantic information, and the user's preference) but also a classification method including reading the degrees of concentration assigned in advances and classifying videos or video sections based on the assigned degrees of concentration for watching or a method including user's adding corrections. In the present exemplary embodiment, a plurality of patterns are stored by, for example, changing factors to be integrated according to the user's preference and intention at the time of integrating these pieces of information.

The played video selection unit 422 decides videos or video sections to be played from among the videos or the video sections to be played based on the video/section information stored in the video/section information storage unit 412, the classification result information (the degrees of concentration for watching) stored in the classification result storage unit 413, the degrees of user's concentration on videos calculated by the user's concentration derivation unit 440, and the preference/intention information stored in the preference/intention information storage unit 470. The other respects are similar to those according to the first exemplary embodiment.

Figure 15:
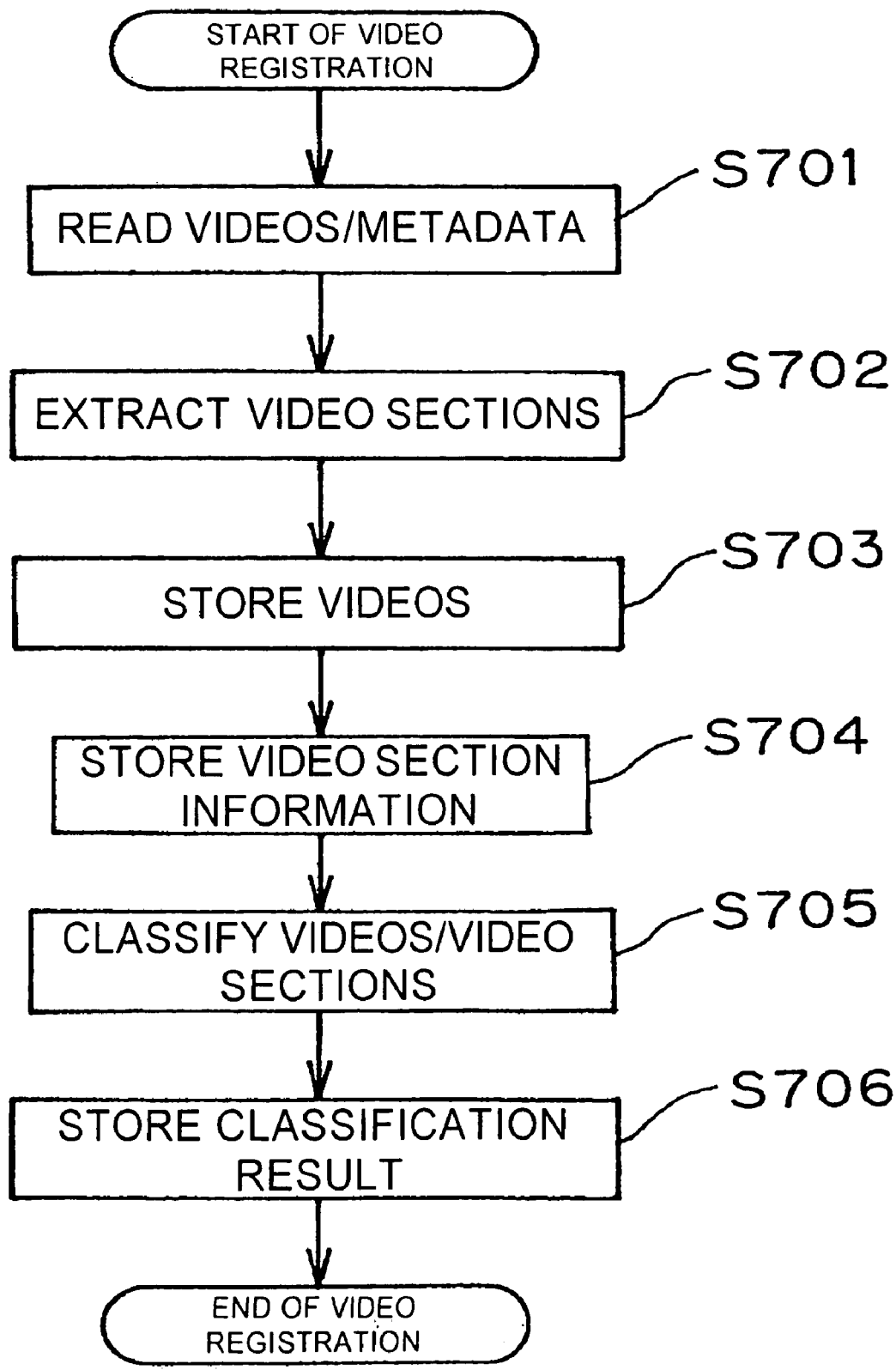
FIG. 15 is a flowchart showing an example of a video registration operation according to the fourth exemplary embodiment.

Operation according to the present exemplary embodiment will next be described. Similarly to the first exemplary embodiment, the operation according to the present exemplary embodiment is roughly divided into two operations of a video registration operation and a video playing operation. The video registration operation will first be described. FIG. 15 is a flowchart showing an example of the video registration operation according to the present exemplary embodiment. The video registration operation according to the present exemplary embodiment is basically similar to that according to the first exemplary embodiment.

First, as shown in FIG. 15, the video registration unit 460 reads videos and metadata accompanying the videos (step S701). The video registration unit 460 receives broadcast signals from, for example, an antenna, a receiver circuit, and a decoder included in the video playing device. Further, the video registration unit 460 receives video signals via, for example, the Internet. The video registration unit 460 also inputs video signals output from a video camcorder connected to the video playing device. The video registration unit 460 further reads metadata if the metadata accompanying the video is present.

Next, the video registration unit 460 divides the read videos into series of sequences and extracts video sections if necessary (step S702). The video registration unit 460 extracts video sections by, for example, dividing the videos into shots using continuity or discontinuity of signal features. Alternatively, the video registration unit 460 may extract the video sections by, for example, a method including detecting a visual effect such as fade/wipe from the videos and setting the detected visual effect as a switch of a scene, a method including analyzing voice in the videos and setting a location where the voice semantically changes as a boundary, a method including dividing the videos into shots based on script information added to the video or the like, or a method using section information such as chapters or captures added to each of the videos in advance.

Next, the video registration unit 460 registers the read videos in the video storage unit 411 (step S703). Further, the video registration unit 460 registers the metadata read or generated to accompany the videos registered in the video storage unit 411 in the video/section information storage unit 412 as the video/section information (step S704). Moreover, if the video sections are extracted, the video registration unit 460 registers a start point and an endpoint of the video sections as well as identification information allocated to each of the video sections in the video/section information storage unit 412.

Next, the classification unit 421 classifies the videos registered in the video storage unit 411 by the video registration unit 460 or each of the video sections of the videos according to the degrees of concentration for watching (step S705). The classification unit 421 calculates the degrees of concentration for watching the videos or each of the video sections of the videos based on the videos registered in the video storage unit 411, the information on the videos or each of the video sections of the videos registered in the video/section information storage unit 412, and the preference/intention information stored in the preference/intention information storage unit 470, and classifies the videos or each of the video sections of the videos according to the calculated degree of concentration for watching.

Figure 16:
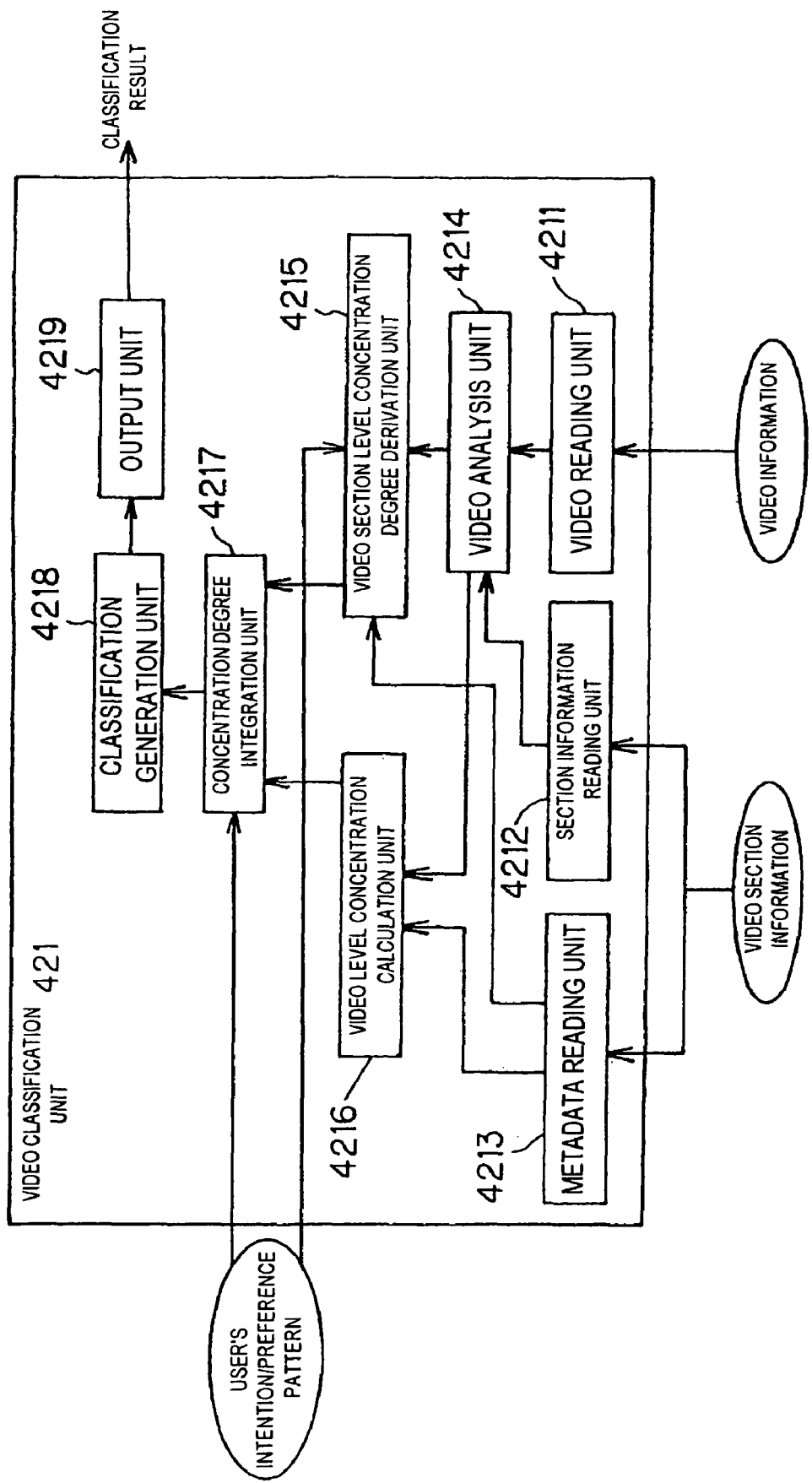
FIG. 16 is a block diagram showing an example of a configuration of a classification unit 421.

FIG. 16 is a block diagram showing an example of a configuration of the classification unit 421. As shown in FIG. 16, the classification unit 421 includes a video reading unit 4211, a section information reading unit 4212, a metadata reading unit 4213, a video analysis unit 4214, a video level concentration calculation unit 4216, a video section level concentration degree derivation unit 4215, a concentration degree integration unit 4217, a classification generation unit 4218, and an output unit 4219.

The present exemplary embodiment differs from the first exemplary embodiment in that the video level concentration calculation unit 4216, the video section level concentration degree derivation unit 4215, and the concentration ratio integration unit 4217 calculate the degrees of concentration on video level according to the user's preference and intention.

The video level concentration calculation unit 4216 calculates a degree of concentration necessary to watch at a video level based on the feature quantities at the video level extracted by the video analysis unit 4214, the metadata of a video unit read by the metadata reading unit 4213, and the preference/intention information (such as the user's preference and intention pattern) stored in the preference/intention information storage unit 470. The video level concentration calculation unit 4216 may, for example, set a weighting factor according to importance level in advance for each item of feature quantities calculated by the video analysis unit 4214 and calculate the sum of each of scores. Further, the video level concentration calculation unit 4216 may use, for example, a method of calculating an average and a variance for all the videos and normalizing. The video section level concentration degree derivation unit 4215 performs a similar processing to that performed by the video level concentration calculation unit 4216 on all the videos, on each of the video sections and calculates a degree of concentration necessary to watch at each video section level if necessary.

The concentration degree integration unit 4217 calculates a degree of concentration for watching the video or the video section in light of the degree of concentration necessary to watching at the video level and, if necessary, the degree of concentration necessary to watch at the video section level as well as the user's preference and intention. The concentration degree integration unit 4217 makes a general evaluation in consideration of an instance in which even if a video genre is a drama of which requires a high degree of concentration for watching, the video section is a scene part which does not require a high degree of concentration for watching. The concentration degree integration unit 4217 may use, for example, a method of calculating a sum using a weighting factor or a method of selecting a maximum value or a minimum value of the two ratios. It is to be noted that the concentration degree integration unit 4217 may calculate a plurality of degrees of concentrations for watching by, for example, changing factors to be integrated according to the user's preference and intention. It is to be noted that this is only an example of calculation and that a part of this example may be dealt with or other feature information may be added to this example to calculate the degrees of concentration for watching.

The classification result storage unit 413 stores the degree of concentration for watching the videos or the video sections output from the classification unit 421 (step S706).

Figure 17:
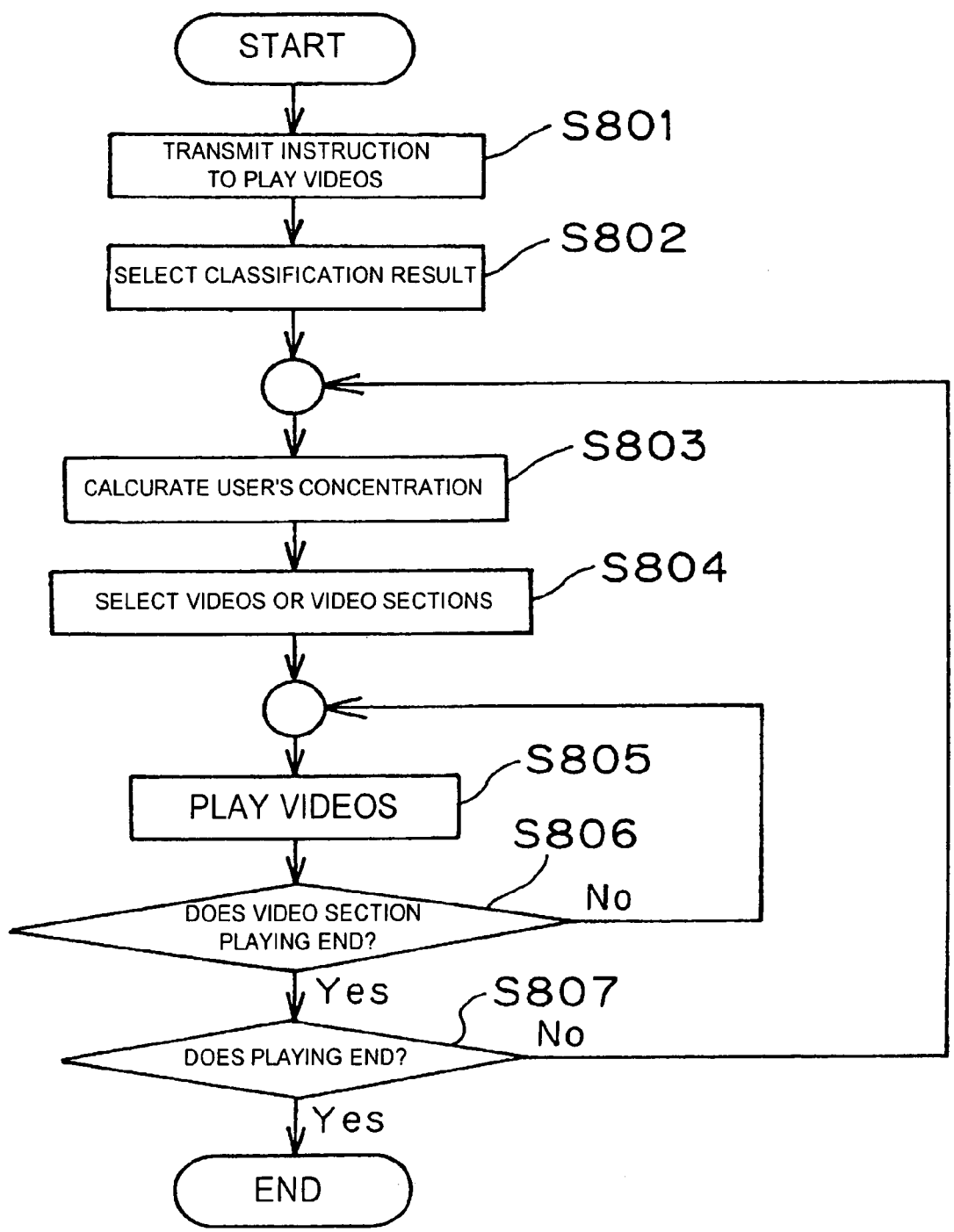
FIG. 17 is a flowchart showing an example of a video playing operation according to the fourth exemplary embodiment.

The video playing operation will next be described. FIG. 17 is a flowchart showing an example of the video playing operation according to the present exemplary embodiment. As shown in FIG. 17, first, the playing/stop control unit 450 transmits an instruction to start playing to the video playing unit 430 and an instruction to extract the degree of user's concentration on the video (the degree of user's concentration on a video) to the user's concentration derivation unit 440 (step S801).

The played video selection unit 422 detects the user's preference or intention from the preference/intention information storage unit 470, and selects a corresponding classification result to the user's preference or intention from among the classification results stored in the classification result storage unit 413 (step S802). The played video selection unit 422 may, for example, cause the user to select and input the intention when the user operates start of replay and store the intention in the preference/intention information storage unit 470. The playing video selection unit may also store the genre previously played or the like in the preference/intention information storage unit 470.

The user's concentration derivation unit 440 calculates the degrees of user's concentration on videos (step S803). Since a configuration and an operation of the user's concentration derivation unit 440 are similar to those of the user's concentration derivation unit 140 according to the first exemplary embodiment, they will not be repeated herein.

The played video selection unit 422 selects videos or video sections to be played next based on the degrees of user's concentration on videos calculated by the user's concentration derivation unit 440 and the classification result (the degree of concentration for watching) corresponding to the user's preference or intention among the classification result for each of the video sections to be played stored in the classification result storage unit 413 (step S804). The played video selection unit 422 extracts videos or video sections necessary to watch at the degree of concentration equal to or lower than the degree of user's concentration on a video by comparing the current degree of user's concentration on a video with the degree of concentration for watching corresponding to the user's preference or intention among the degree of concentration for watching each of video sections to be played. The played video selection unit 422 outputs a video sequence of the selected videos or the selected video sections to the video playing unit 430. The played video selection unit 422 may output the information indicating the start point and the end point of the video section stored in the video/section information storage unit 412 to the video playing unit 430.

The video playing unit 430 reproduces the input video sequence (step S805). The video playing unit 430 continues playing until playing of the videos or the video sections selected by the played video selection unit 422 ends (step S806). If the playing of the selected videos or video sections ends, the videos or the video sections to be played are repeatedly selected until playing of all the videos or all the video sections to be played ends (back to the step S803). If the playing of all the videos or all the video sections to be played ends, the video playing processing ends (step S807; Yes).

As stated so far, according to the present exemplary embodiment, when the degree of user's concentration on the video is low, the videos or the video sections necessary to watch at the lower degree of concentration than the observed degree of concentration (the degree of user's concentration on a video) may be selectively played. Due to this, the videos or the video sections which the user may easily "watch while performing other operation" are preferentially selected and played. On this occasion, it is possible to achieve video playing corresponding to a user's ability, a user's intention, and a user's preference. It is, therefore, possible to more effectively watch videos without disturbing understanding of contents of the videos even in a state in which the user performs other operation. The other respects are similar to those of the first exemplary embodiment.

Fifth Exemplary Embodiment

Figure 18:
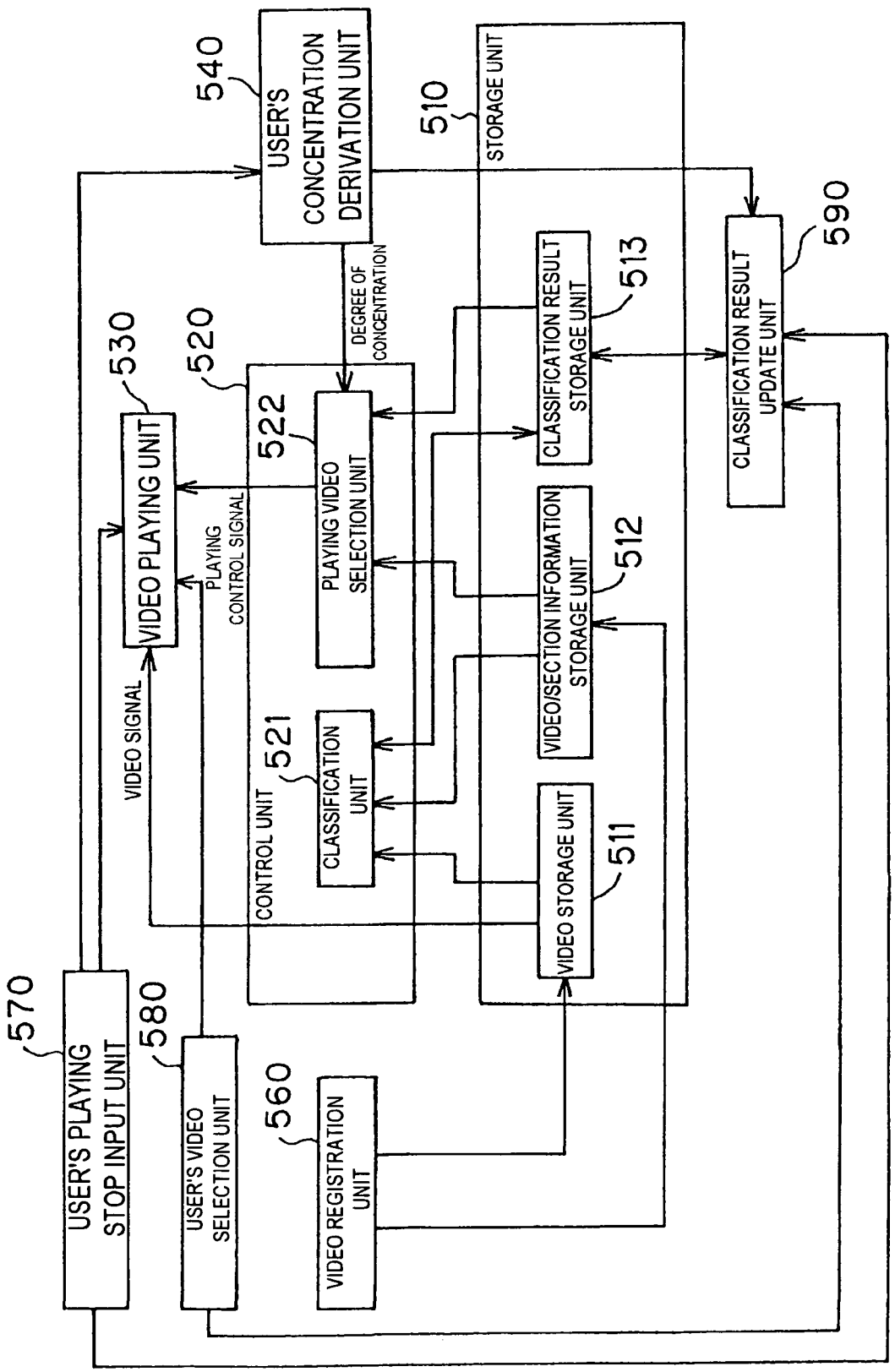
FIG. 18 is a block diagram showing an example of a configuration of a video playing device according to a fifth exemplary embodiment.

A fifth exemplary embodiment for carrying out the present invention will next be described with reference to the drawings. FIG. 18 is a block diagram showing an example of a configuration of a video playing device according to the fifth exemplary embodiment. The video playing device shown in FIG. 18 includes a storage unit 510, a control unit 520, a video playing unit 530, a user's concentration r derivation unit 540, a video registration unit 560, a user's playing stop input unit 570, a user's video selection unit 580, and a classification result update unit 590. The storage unit 510 includes a video storage unit 511, a video/section information storage unit 512, and a classification result storage unit 513. Further, the control unit 520 includes a classification unit 521 and a playing video selection unit 522.

As shown in FIG. 18, the video playing device according to the present exemplary embodiment differs in that the device includes the user's playing stop input unit 570 in place of the playing/stop control unit 150 and the device further includes user's video selection unit 580 and a classification result update unit 590 comparing to the first exemplary embodiment shown in FIG. 1.

In the present exemplary embodiment, the degrees of user's concentration are updated according to a user's operation input.

The user's playing stop input unit 570 is an input unit for the user to instruct stop of playing of videos. The user playing stop input unit 570 inputs information instructing stop of playing according to a user's operation and controls playing of videos to be started and stopped. The user video selection unit 580 is an input unit for the user to select videos or video sections to be played. For example, the user video selection unit 580 selectively outputs the videos or the video sections to be played to a screen and to input information indicating the videos or the video sections selected by the user according to a user's operation.

The classification result update unit 590 estimates a user's watching ability based on the information indicating the stop instruction and selection result input according to the user's operation, thereby updating the degrees of user's concentration on a video calculated by the user's concentration derivation unit 540 and updating classification results of each of the videos or each of the video sections. For example, if the user stops playing, the classification result update unit 590 determines that the degree of concentration for watching the video or the video section being played is higher than the degree of user's concentration on a video at that time, and updates the classification result (the degree of concentration for watching) of the video or the video section being played. Further, for example, if the user selects a target to be played via the user video selection unit 580, the classification result update unit 590 determines that the degree of concentration for watching the selected video or video section is lower than the degree of user's concentration on a video at that time, and updates the classification result (the degree of concentration for watching) of the selected video or video section. It is to be noted that the other respects are similar to those of the first exemplary embodiment.

Figure 19:
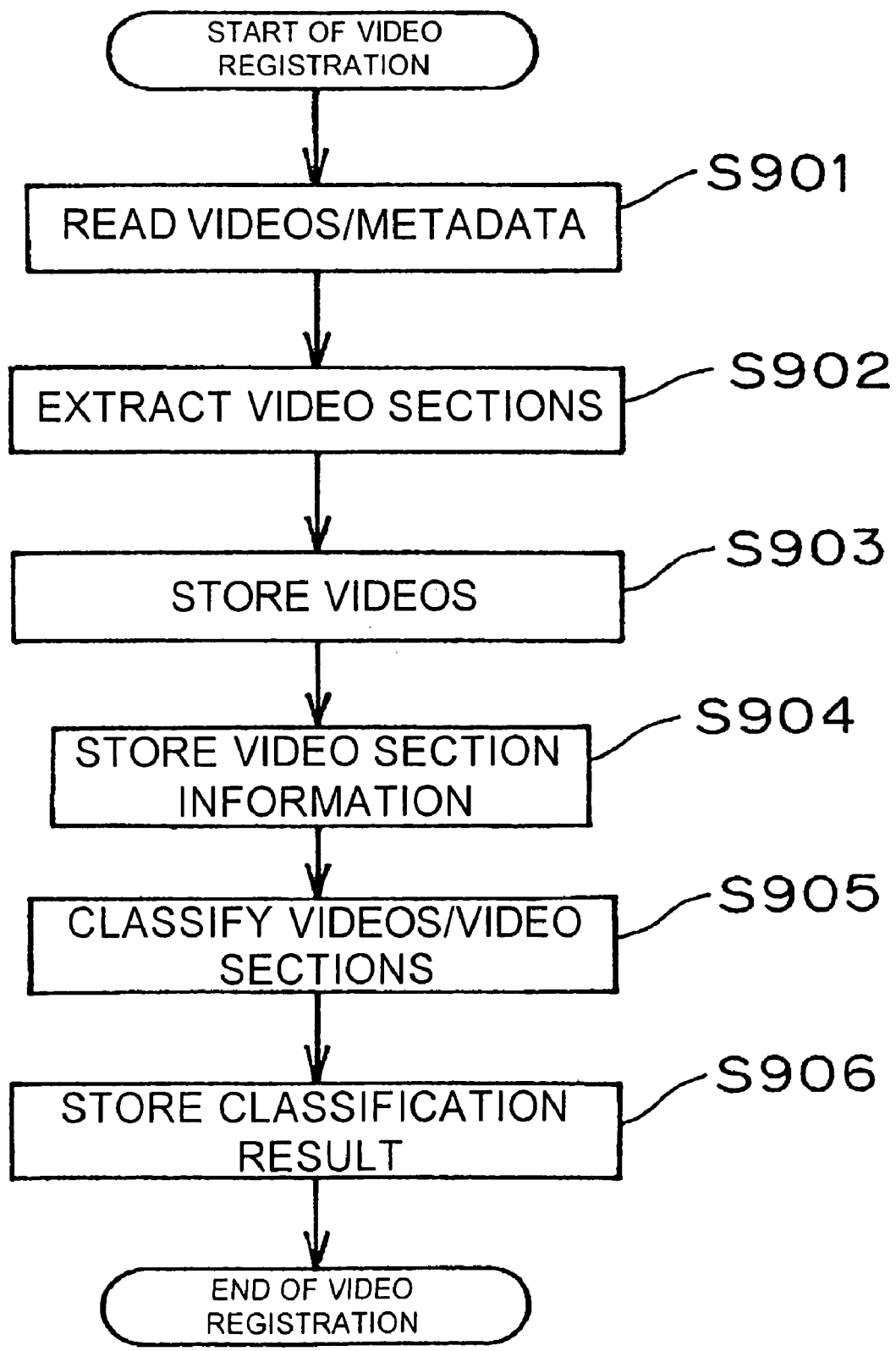
FIG. 19 is a flowchart showing an example of a video registration operation according to the fifth exemplary embodiment.

Operation according to the present exemplary embodiment will next be described. Similarly to the first exemplary embodiment, the operation according to the present exemplary embodiment is roughly divided into two operations of a video registration operation and a video playing operation. The video registration operation will first be described. FIG. 19 is a flowchart showing an example of the video registration operation according to the present exemplary embodiment. The video registration operation according to the present exemplary embodiment is basically similar to that according to the first exemplary embodiment.

First, the video registration unit 560 reads videos and metadata accompanying the videos (step S901). As for the videos, the video registration unit 560 receives broadcast signals via, for example, an antenna, a receiver circuit, and a decoder. Further, the video registration unit 560 receives video signals via, for example, the Internet. The video registration unit 560 reads a video file output from, for example, a video camcorder. The video registration unit 560 also reads metadata if the metadata accompanying the video is present.

Next, the video registration unit 560 divides the read videos into series of sequences and extracts video sections if necessary (step S902). The video registration unit 560 extracts the video sections by, for example, dividing the videos into shots using continuity or discontinuity of signal features. Alternatively, the video registration unit 560 may extract the video sections by, for example, a method including detecting a visual effect such as fade/wipe from the videos and setting the detected visual effect as a switch of a scene, a method including analyzing voice in the videos and setting a location where the voice changes semantically as a boundary, a method including dividing the videos into shots based on script information added to video or the like, or a method using section information such as chapters or captures added to each of the videos in advance.

Next, the video registration unit 560 registers the read videos in the video storage unit 511 (step S903). Further, the video registration unit 560 registers the metadata read or generated to accompany the videos registered in the video storage unit 511 in the video/section information storage unit 512 as the video/section information (step S904). If the video sections are extracted, the video registration unit 560 registers a start point and an end point of the video sections in the video/section information storage unit 512.

Next, the classification unit 521 classifies the videos or each of the video sections of the videos registered in the video storage unit 511 by the video registration unit 560 according to the degrees of concentration for watching (step S905). The classification unit 521 calculates the degree of concentration for watching the videos or each of the video sections of the videos based on the videos registered in the video storage unit 511, information on the videos or each of the video sections of the videos registered in the video/section information storage unit 512, and classifies the videos or each of the video sections of the videos according to the calculated degrees of concentration for watching. Since a configuration and an operation of the classification unit 521 are similar to the classification unit 121 according to the first exemplary embodiment shown in FIG. 3, they will not be repeated herein.

The classification result storage unit 513 stores the degree of concentration for watching the videos or each of the video sections output from the classification unit 521 (step S906).

Figure 20:
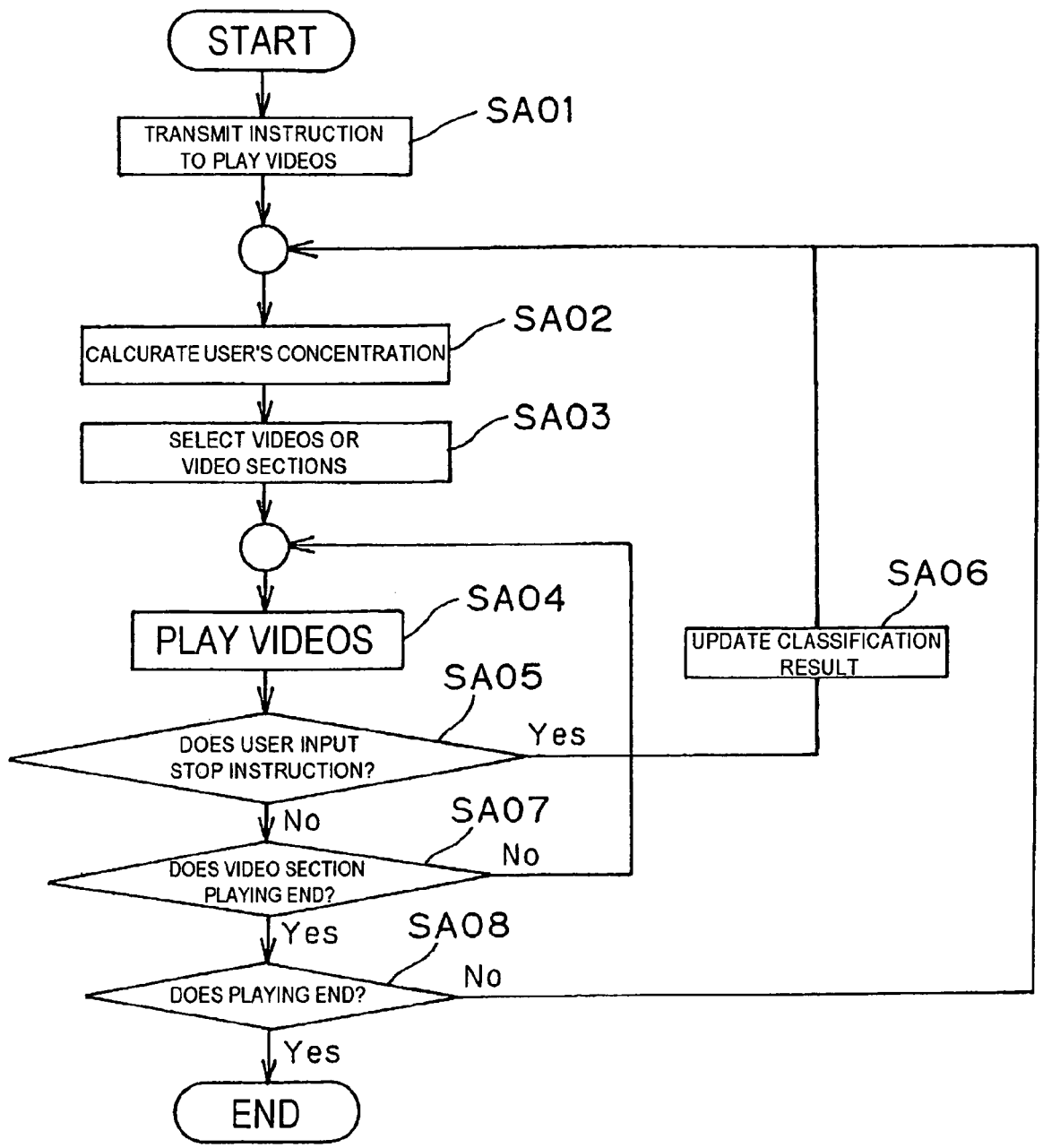
FIG. 20 is a flowchart showing an example of a video playing operation according to the fifth exemplary embodiment.

The video playing operation will next be described. FIG. 20 is a flowchart showing an example of the video playing operation according to the fifth exemplary embodiment.

As shown in FIG. 20, first, the user's playing stop input unit 570 transmits an instruction to start playing to the video playing unit 530 and an instruction to extract the degree of user's concentration on the video (the degree of user's concentration on a video) to the user's concentration derivation unit 540 (step SA01).

The user's concentration derivation unit 540 calculates the degrees of user's concentration on videos (step SA02). Since a configuration and an operation of the user's concentration derivation unit 540 are similar to those of the user's concentration derivation unit 140 according to the first exemplary embodiment shown in FIG. 5, they will not be repeated herein.

The playing video selection unit 522 selects videos or video sections to be played next based on the degrees of user's concentration on videos calculated by the user's concentration derivation unit 540 and the classification result (the degree of concentration for watching) for each of the videos or the video sections to be played stored in the classification result storage unit 513 (step SA03). The playing video selection unit 522 extracts videos or video sections necessary to watch at the degree of concentration equal to or lower than the observed degree of user's concentration on a video by comparing the current degree of user's concentration on a video with the degree of concentration for watching corresponding to the user's preference or intention among the degrees of concentration for watching the respective videos or video sections to be played. The playing video selection unit 522 selects one of the extracted videos or video sections and outputs a video sequence of the selected videos or video sections to the video playing unit 530. The playing video selection unit 522 may output the information stored in the video/section information storage unit 512 and indicating the start point and the end point of each video section to the video playing unit 530.

The video playing unit 530 plays the input video sequence (step SA04). It is assumed herein that the user operates stop of playing. The user's playing stop input unit 570 inputs information indicating stop of playing according to the user's operation and instantly controls the playing of videos to be stopped (step SA05; Yes). Furthermore, the classification result update unit 590 detects the information input from the user's playing stop input unit 570 and updates the classification result of the videos or the video sections played just previously (step SA06). The operation for detecting the degrees of user's concentration on videos is performed again to re-select videos or video sections to be played next (back to step SA02).

If the user transmits an instruction to stop playing via the user's playing stop input unit 570, the user's video selection unit 580 may selectively output videos or video sections to be played next and cause the user to select. The user video selection unit 580 selects the videos or the video sections to be played next according to the user's selection input operation.

If the user does not transmits the instruction to stop playing, the video playing unit 530 continues playing until playing of the video sections selected by the playing video selection unit 522 or the user's playing stop input unit 570 ends (step SA07). If playing of the selected video sections ends, the video playing unit 530 repeatedly selects video sections to be played until playing of all the video sections to be played ends (back to step SA02). If playing of all the video sections to be played ends, the video playing processing ends (step SA08; Yes).

As stated so far, according to the present exemplary embodiment, when the degree of user's concentration on the videos is low, the videos or the video sections necessary to watch at the lower degree of concentration than the observed degree of concentration (the degree of user's concentration ration a video) may be selectively played. Due to this, the videos or the video sections which the user may easily "watching while performing other operation" are preferentially selected and played. Moreover, the user's watching ability may be estimated from the user's stop operation or selection operation and the degree of concentration necessary to watch videos or video sections may be dynamically updated. It is, therefore, possible to make more practical selection.

Sixth Exemplary Embodiment

Figure 21:
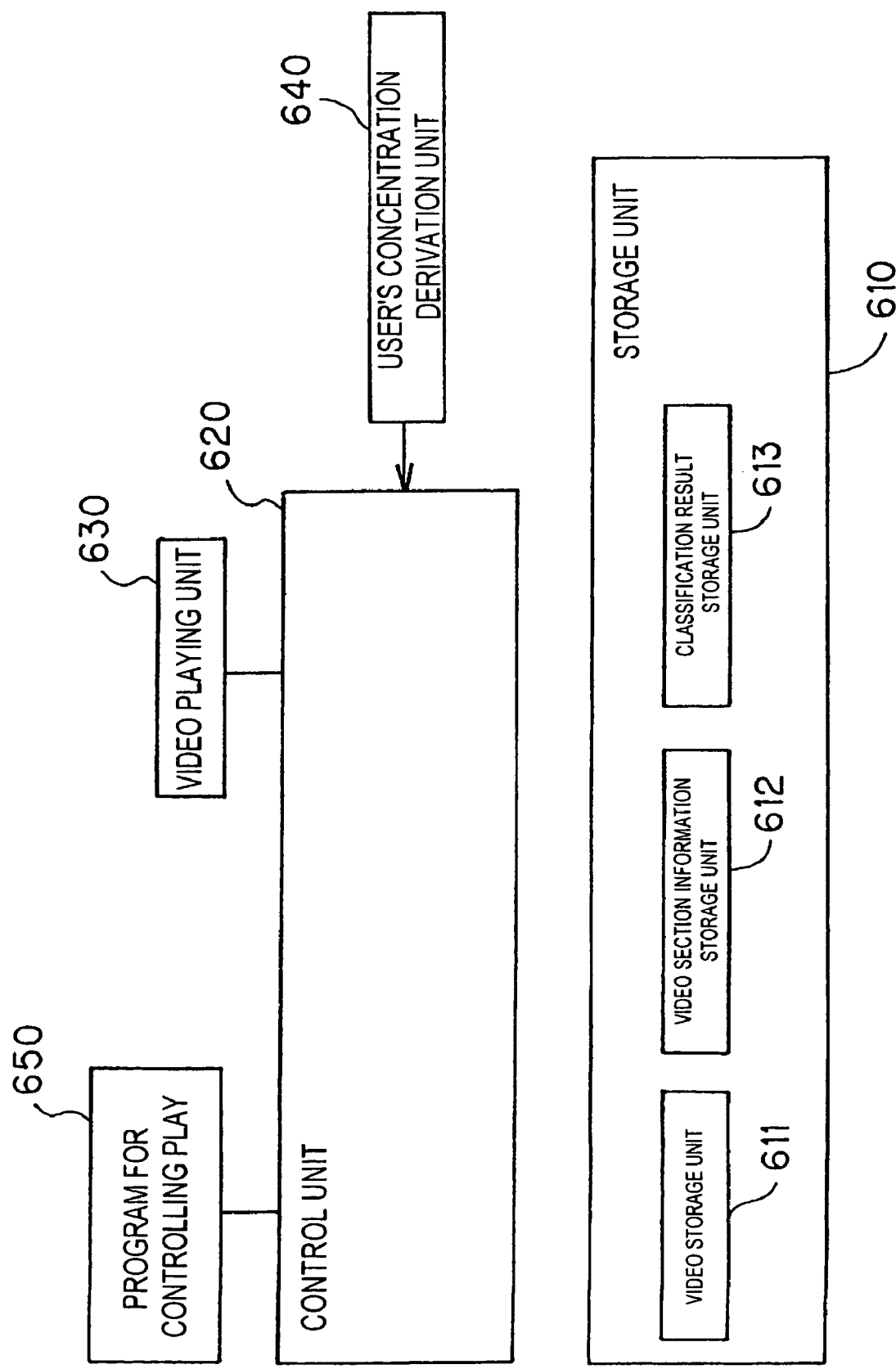
FIG. 21 is a block diagram showing an example of a configuration of a video playing device according to a sixth exemplary embodiment.

A sixth exemplary embodiment for carrying out the present invention will next be described with reference to the drawings. FIG. 21 is a block diagram showing an example of a configuration of a video playing device according to the sixth exemplary embodiment. The video playing device shown in FIG. 21 includes a storage unit 610, a recording/playing control unit 620, a video playing unit 630, a user's concentration derivation unit 640, and a program for controlling play 650.

The playing control program 650 may be read from a storage medium (such as a CD-ROM) and executed. Although not shown in the figure, the playing control program 650 may be stored in a storage device, in advance, read from the storage device, and executed.

As shown in FIG. 21, the video playing device according to the present exemplary embodiment differs from first exemplary embodiment shown in FIG. 1 in that the control unit 120 is replaced by the recording/playing control unit 620.

The recording/playing control unit 620 is a processing device operating according to a program of a CPU or the like. The playing control program 650 is read by the recording/playing control unit 620 to control operation performed by the recording/playing control unit 620, thereby recording information in the storage unit 610 and playing videos. The playing control program 650 is, for example, a program for executing the processes performed by the video playing device shown in the first exemplary embodiment.

The video playing device according to the present exemplary embodiment operates according to control of the playing control program 650. If the playing control program 650 is, for example, a program for executing the processes performed by the video playing device shown in the first exemplary embodiment, the video playing device according to the present exemplary embodiment operates similarly to the video playing device according to the first exemplary embodiment shown in FIGS. 2 and 4. Furthermore, the playing control program 650 is not limited to the program for executing the processes of the video playing device shown in the first exemplary embodiment but may be a program for executing the processes of the video playing device shown in the second to fifth exemplary embodiments.

The invention claimed is:

1. A video playing device for playing a video, said video playing device comprising:
    a classification unit classifying a video or a video section to be played, by calculating a number indicative of a complexity of said video or video section, said number being associated with said video or video section as representing a degree of a user's concentration necessary for watching the video;
    a user's concentration calculation unit calculating a current degree of user's concentration on a video; and
    a video playing unit comparing said current degree of user's concentration on a video with the degree of user's concentration necessary for watching the video for each of a video or video section selectively to be played, according to a classification result of the classification unit, and determining which videos or video sections have degrees of user's concentration necessary—for watching video which are lower than the current degree of user's concentration on a video.

2. The video playing device according to claim 1, further comprising:
    a storage unit storing relations between the video or video sections to be played and the degree of user's concentration necessary for watching the video,
    wherein said classification unit classifies the video or video section to be played while referring to said storage unit.

3. The video playing device according to claim 1, further comprising:
    a video storage unit storing video to be played;
    a video metadata storage unit storing metadata of the video, including at least information about the video sections; and
    a video selection unit selecting the video or video section to be played based on a comparison of the calculation of the current degree of user's concentration on a video by the user' concentration calculation unit and classification results of the classification unit for the video or the video section to be played,
    wherein the classification unit classifies each video or video section stored in said video storage unit based on the degree of the user's concentration necessary for watching the video or video section, and
    wherein the video playing unit plays the video or the video section selected by said video selection unit.

4. The video playing device according to claim 2, further comprising:
    a video storage unit storing video to be played;
    a video metadata storage unit storing metadata of the video, including at least information about video sections; and
    a video selection unit selecting the video or video section to be played based on a comparison of the current degree of user's concentration on a video by the user' concentration calculation unit and classification results of the classification unit for the video or the video section to be played,
    wherein the classification unit classifies each of the video or video section stored in said video storage unit based on a user's concentration ratio necessary for watching the video or video section, and wherein the video playing unit plays the video or the video section selected by said video selection unit.

5. The video playing device according to claim 3, wherein the video selection unit selects the video or video section which the degree of user's concentration necessary for watching the video or video section is lower than the current degree of user's concentration on a video if the current degree of the user's concentration on a video is lower than a threshold value.

6. The video playing device according to claim 3, further comprising:

a video playing history storage unit storing previously played videos or video sections as history information, wherein the video selection unit selects the video or video section to be played based on the current degree of user's concentration on a video calculated by the user's concentration calculation unit, the classification result of the classification unit for the video or video section to be played, and the history information stored in said video playing history storage unit.

7. The video playing device according to claim 6, wherein the video selection unit selects a video or video section for which the degree of a user's concentration necessary for watching the video is lower than the current degree of user's concentration on a video other than previously produced videos or video sections indicated by the history information stored in the video playing history storage unit.

8. The video playing device according to claim 3, further comprising:

a relational information storage unit storing relational information indicating a subordination among each of videos or video sections of the videos, wherein the video selection unit selects the video or video section which is in subordination to videos or video sections played so far, and for which the degree of a user's concentration necessary for watching the video is lower than the current degree of user's concentration on a video calculated by the user's concentration calculation unit, the classification result of the classification unit for the video or the video section to be played, and the relational information stored in said relational information storage unit.

9. The video playing device according to claim 8, wherein the video selection unit selects a video section to be played from video sections belonging to a same video as a video section being played.

10. The video playing device according to claim 8, wherein the relational information storage unit stores the relational information including at least information indicating a temporal continuity among each of the videos or each of the video sections of the videos or information indicating a semantical subordination.

11. The video playing device according to claim 8, wherein the video selection unit selects the video section for which a degree necessary for watching the video is lower than the current degree of user's concentration on a video and being in no subordination to a video section being played if a degree of user's concentration necessary to watch a video section temporally continuous to the video section being played is higher than the current degree of user's concentration on a video.

12. The video playing device according to claim 3, further comprising:

an interrupt detection unit detecting a change in the current degree of user's concentration on the video, and interrupting a playing if a degree of user's concentration necessary for watching the video for a video or video section being played is lower than the current degree of user's concentration on the video.

13. The video playing device according to claim 12, wherein the interrupt detection unit detects the change in the current degree of user's concentration on the video, and, if the degree of user's concentration necessary for watching the video or video section being played is lower than the current degree of user's concentration on the video, interrupts playing after playing up to an end of the video section being played; and the playing video selection unit selects a video section to be played based on the degree of user's concentration detected at said end of the video section.

14. The video playing device according to claim 12, further comprising an interrupt point storage unit storing information indicating an interrupt point, the interrupt point being a position at which the playing is interrupted, wherein the interrupt detection unit stores an interrupt point to said interrupt point storage unit when the replay is interrupted, and the video selection unit selects a video section to restart playing a video from said interrupt point if the current degree of user's concentration on a video is higher than a degree of concentration necessary for watching a video for a video section temporally continuous to the interrupt point after the interrupt detection unit interrupts playing.

15. The video playing device according to claim 12, wherein the video selection unit selects a video section so as to restart playing a video from an interrupt point after finishing playing all video sections in subordination to the video section currently being played after interrupting replay.

16. The video playing device according to claim 12, wherein the interrupt detection unit interrupts a replay and stores an interrupt point at which the replay is interrupted in an interrupt point storage unit if the current degree of user's concentration on the video is higher than a degree of user's concentration necessary for watching a video for a video section temporally continuous to the video section being played; and the video selection unit selects a video section being in semantically no subordination to a video section being played among video sections necessary to watch at a concentration ratio lower than the current degree of user's concentration on a video detected at which the replay is interrupted if replay is interrupted by the interrupt detection unit and, moreover, selects a video section so as to restart the replay of a video from an interrupt point if the current degree of user's concentration on a video is higher than the user's concentration ratio necessary for watching a video for a video section temporally continuous to the interrupt point when a replay of a video section being in semantically no subordination ends.

17. The video playing device according to claim 3, wherein the classification unit calculates the degree of a user's concentration necessary for watching the video for a video or a video section to be played based on one or more pieces of information out of information indicating a genre, an importance level, a difficulty level, and a coincidence with a user's preference, and classifies the video or the video section to be played according to the calculated degree of a user's concentration necessary for watching the video.

18. The video playing device according to claim 17, wherein the classification unit uses, as the difficulty level, one or more pieces of information out of a quantity of voices per unit time included in the video or the video section and a number of characters presented per unit time.

19. The video playing device according to claim 3, further comprising:
a user information acquisition unit acquiring user information including one or more pieces of information out of information indicating a user's ability, a user's preference, and a user's intention of video watching,
wherein the classification unit changes the degree of user's concentration necessary for watching the video for a video or video section based on the user information acquired by said user information acquisition unit.

20. The video playing device according to claim 3, wherein the user's concentration calculation unit calculates the degree of a user's concentration necessary for watching the video by estimating a degree of user's concentration on the video based on one or more pieces of information out of information indicating a video playing situation, indicating a degree of concentration of a concentration on an other operation performed in parallel, and a video watching environment.

21. The video playing device according to claim 20, wherein the degree of user's concentration calculation unit uses, as the video playing situation, one or more pieces of information out of a screen size of a video being played, a screen position, and a volume of a played voice.

22. The video playing device according to claim 20, wherein the user's video concentration calculation unit uses, as the degree of concentration on the other operation performed in parallel, one or more pieces of information out of a type of each application being run, a screen size, a screen position, and an information input amount per unit time.

23. The video playing device according to claim 20, wherein the user's concentration calculation unit uses, as the degree of concentration on the other operation performed in parallel, a number of key strokes per unit time.

24. The video playing device according to claim 20, wherein the user's concentration calculation unit uses, as the video watching environment, one or more pieces of information out of a time at which a video replay is performed, a position information, and a noise amount at a playing location.

25. The video playing device according to claim 20, wherein the user's concentration calculation unit estimates the current degree of user's concentration on the video based on a user's line of sight information.

26. The video playing device according to claim 3, further comprising:
a stop and start control unit controlling a stop and a restart of a video playing,
wherein the stop and start control unit stops playing the video until the current degree of user's concentration on a video becomes equal to the degree of concentration necessary for watching the video if the video or the video section to be played is not present as a result of a determination based on a predetermined condition.

27. The video playing device according to claim 26, further comprising:

an input unit inputting information indicating an instruction to stop or restart replay according to a user's operation,
wherein the stop and start control unit stops playing and reselects a video or a video section if the stop and start control unit detects information indicating a user's stop instruction input from said input unit.

28. The video playing device according to claim 27, further comprising:
a selection unit permitting a user to select a video or video section to be played,
wherein the stop and start control unit stops playing and controls said selection unit to reselect the video or video section if detecting information indicating the user's stop instruction input from said input unit.

29. The video playing device according to claim 27, wherein the stop and start control unit stops playing and controls the playing video selection unit to reselect the video or video section if the information indicating the user's stop instruction is input via the input unit; and
the playing video selection unit receives instruction from the stop and start control unit and performs a selection from among the videos or the video sections other than the stopped videos or the video sections based on the predetermined condition.

30. The video playing device according to claim 27, further comprising:
a classification result update unit updating the classification result for the video or the video section for which the user's stop instruction is transmitted if the information indicating the user's stop instruction is input via the input unit.

31. A video playing method for playing a video, said method comprising:
classifying, using a processor, a video or a video section to be played according to a degree of user's concentration necessary for watching a video, by calculating a number indicative of a complexity of said video or video section;
calculating a degree of a user's concentration indicating a current degree of user's concentration on the video; and
comparing the current degree of user's concentration on a video with the degree of concentration necessary for watching a video for each video or video section to be played according to a classification result of the classifying processing; and
determining which videos or video sections have a lower degree of user's concentration necessary—for watching a video than the current degree of user's concentration on a video.

32. The video playing method according to claim 31, further comprising:
storing, in a storage unit, a relation between the video or the video section to be played and the degree of user's concentration necessary for watching the video,
wherein said classifying processing classifies the video or the video section to be played while referring to said storage unit.

33. The video playing method according to claim 31, further comprising:
storing the video to be played;
storing metadata of the video, including at least information about the video sections;
classifying each of the video or each of the video section stored based on the degree of user's concentration necessary for watching the video;
calculating a degree of user's concentration indicating a current degree of user's concentration on the video;

selecting the video or the video section to be played based on the degree of user's concentration and a classification result for the video or the video section to be played; and playing the selected video or the selected video section.

34. A non-transitory, computer-readable storage medium, tangibly embodying a video playing program for playing a video and causing a computer to execute:

a processing for classifying a video or a video section to be played according to a degree of user's concentration necessary for watching the video, by calculating a number indicative of a complexity of said video or video section;

a processing for calculating a degree of user's concentration on a video; and a processing for comparing a current degree of user's concentration on a video with the degree of user's concentration necessary for watching the video for each video or each video section to be played according to a classification result of the classifying processing, and determining videos or video sections for which the degree of user's concentration necessary for watching the video is lower than the current degree of user's concentration on a video.

35. The non-transitory, computer-readable storage medium according to claim 34, the program further comprising instructions for:

storing, in a storage unit, a relation between the video or the video section to be played and the degree of user's concentration, wherein said classifying processing classifies the video or the video section to be played while referring to said storage unit.

36. The non-transitory, computer-readable storage medium according to claim 34, tangibly embodying a set of machine-readable instructions causing a computer comprising a storage device storing the video to be played and metadata of the video, including at least information about the video sections, the instructions further causing the computer to execute:

a processing for classifying each video or video section to be played based on a degree of user's concentration necessary for watching the video or the video section;

a processing for calculating a degree of user's concentration on the video;

a processing for selecting the video or the video section to be played based on the calculated degree of user's concentration on the video and a classification result for the video or the video section to be played; and a processing for playing the selected video or the selected video section.

* * * * *